(12) United States Patent
Lau et al.

(10) Patent No.: US 12,461,568 B2
(45) Date of Patent: Nov. 4, 2025

(54) FOLDABLE COMPUTING DEVICE SPINE COVER PLATE

(71) Applicant: Microsoft Technology Licensing, LLC, Redmond, WA (US)

(72) Inventors: Tung Yuen Lau, Hong Kong (CN); Blair Madison Kent, Snohomish, WA (US); Amit Kaistha, Coppell, TX (US); Eric Paul Witt, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 107 days.

(21) Appl. No.: 18/066,026

(22) Filed: Dec. 14, 2022

(65) Prior Publication Data
US 2024/0069605 A1    Feb. 29, 2024

Related U.S. Application Data

(63) Continuation of application No. PCT/CN2022/116075, filed on Aug. 31, 2022.

(51) Int. Cl.
*G06F 1/16* (2006.01)

(52) U.S. Cl.
CPC .................. *G06F 1/1681* (2013.01)

(58) Field of Classification Search
CPC ..... G06F 1/1681; G06F 1/1652; G01F 1/1647
See application file for complete search history.

(56) References Cited

U.S. PATENT DOCUMENTS

| 8,522,399 | B2 | 9/2013 | Kim et al. |
| 9,348,450 | B1 | 5/2016 | Kim |
| 10,398,048 | B2 | 8/2019 | Jeon |
| 2018/0196469 | A1 | 7/2018 | Yamauchi et al. |
| 2021/0263563 | A1 | 8/2021 | Tsuchihashi et al. |
| 2021/0397226 | A1 | 12/2021 | Siddiqui |
| 2022/0353354 | A1* | 11/2022 | Song .................. G06F 1/1652 |

(Continued)

FOREIGN PATENT DOCUMENTS

| CN | 213751699 U | 7/2021 | |
| CN | 115234572 A * | 10/2022 | ............. G09F 9/301 |

(Continued)

OTHER PUBLICATIONS

"International Search Report and Written Opinion Issued in PCT Application No. PCT/CN22/116075", Mailed Date: Feb. 9, 2023, 12 Pages.

(Continued)

*Primary Examiner* — Allen L Parker
*Assistant Examiner* — Peter Krim
(74) *Attorney, Agent, or Firm* — Alleman Hall & Tuttle LLP

(57) ABSTRACT

A computing device includes a first display-supporting frame rotatably coupled to a second display-supporting frame along a hinge axis via a hinge assembly comprising a central spine extending parallel to the hinge axis. A flexible display is supported by the first display-supporting frame and the second display-supporting frame. A spine cover plate extends over the central spine and is moveably coupled to the hinge assembly for translation relative to the central spine as the first display-supporting frame is rotated relative to the second display-supporting frame.

20 Claims, 18 Drawing Sheets

(56) References Cited

U.S. PATENT DOCUMENTS

2023/0384822 A1* 11/2023 Lee ........................ G06F 1/1652
2023/0403347 A1* 12/2023 Liu ........................ H04M 1/022

FOREIGN PATENT DOCUMENTS

| | | |
|---|---|---|
| DE | 112019004827 T5 | 6/2021 |
| EP | 1414219 A1 | 4/2004 |
| KR | 20190135161 A | 12/2019 |
| KR | 102382288 B1 | 4/2022 |

OTHER PUBLICATIONS

Jurrien, I., "OnePlus Tri-Fold Smartphone", Retrieved From: https://en.letsgodigital.org/smartphones/oneplus-foldable-phone/, Dec. 4, 2021, 8 Pages.

* cited by examiner

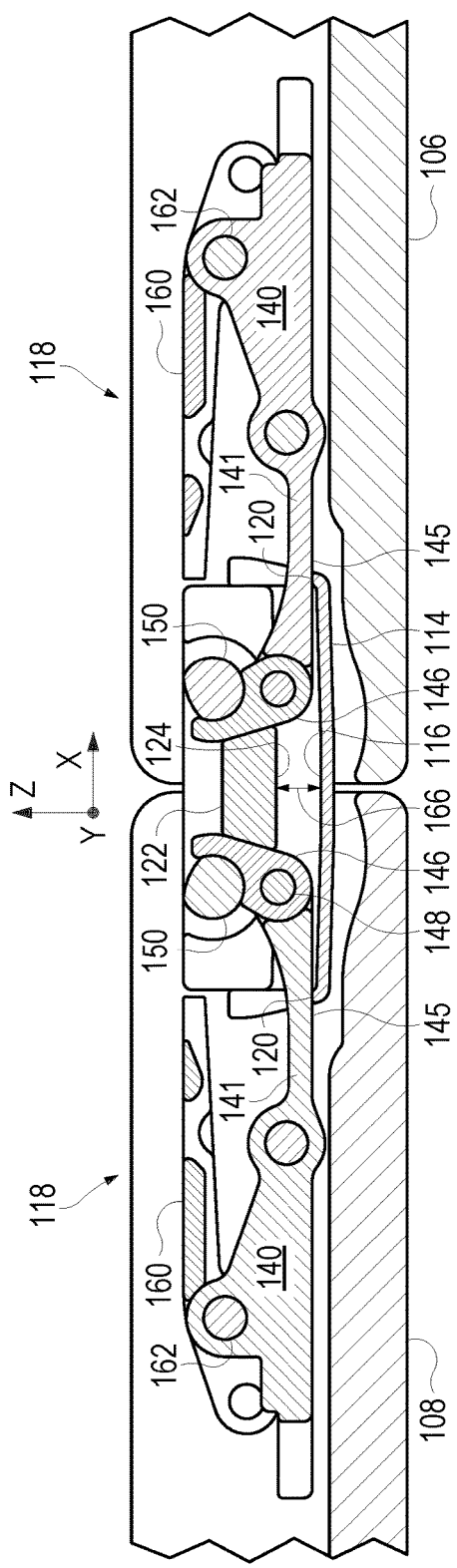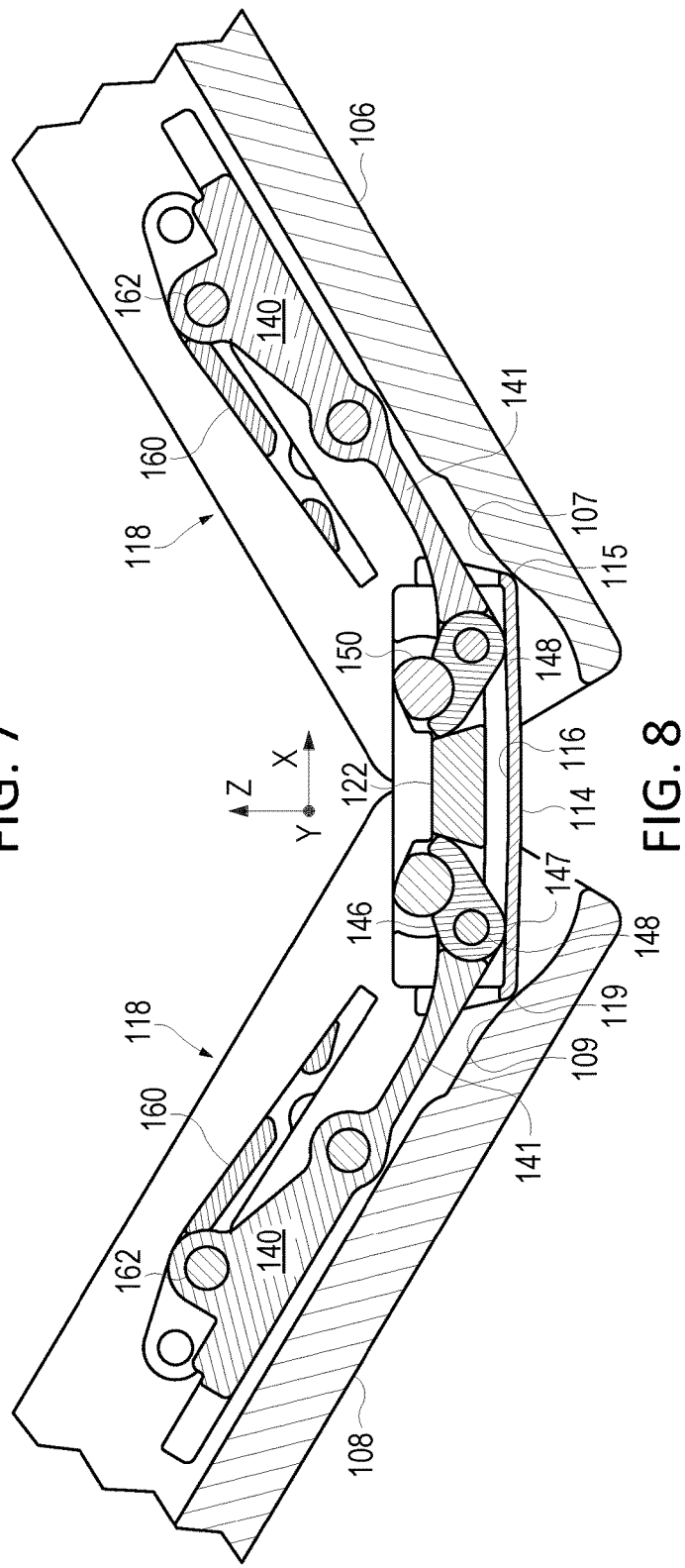

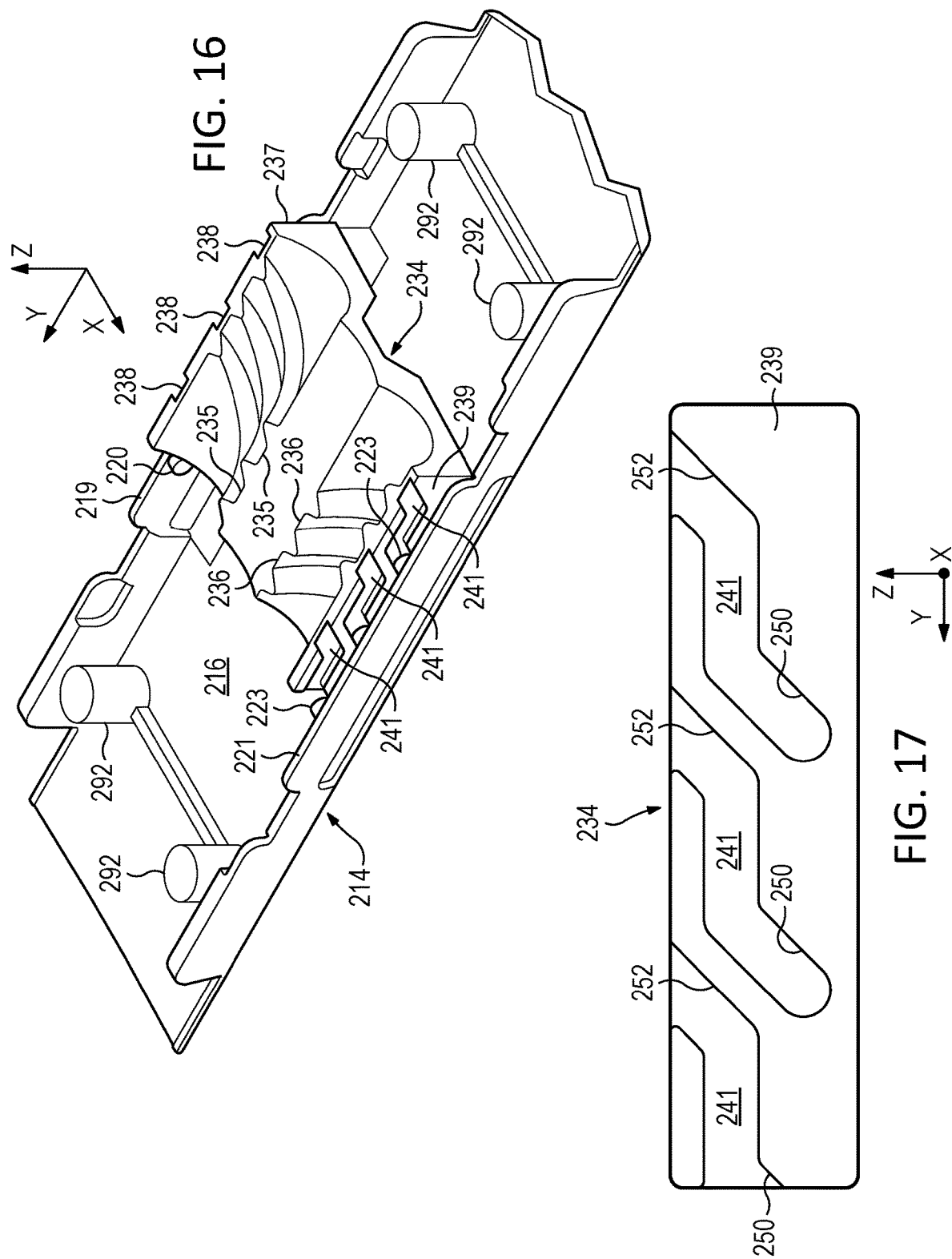

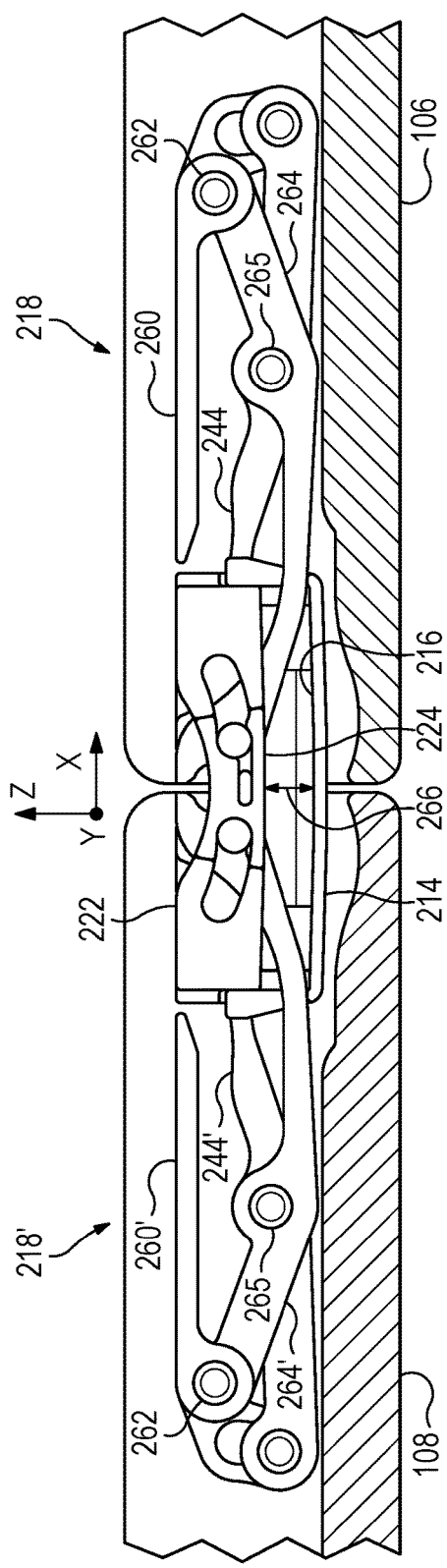
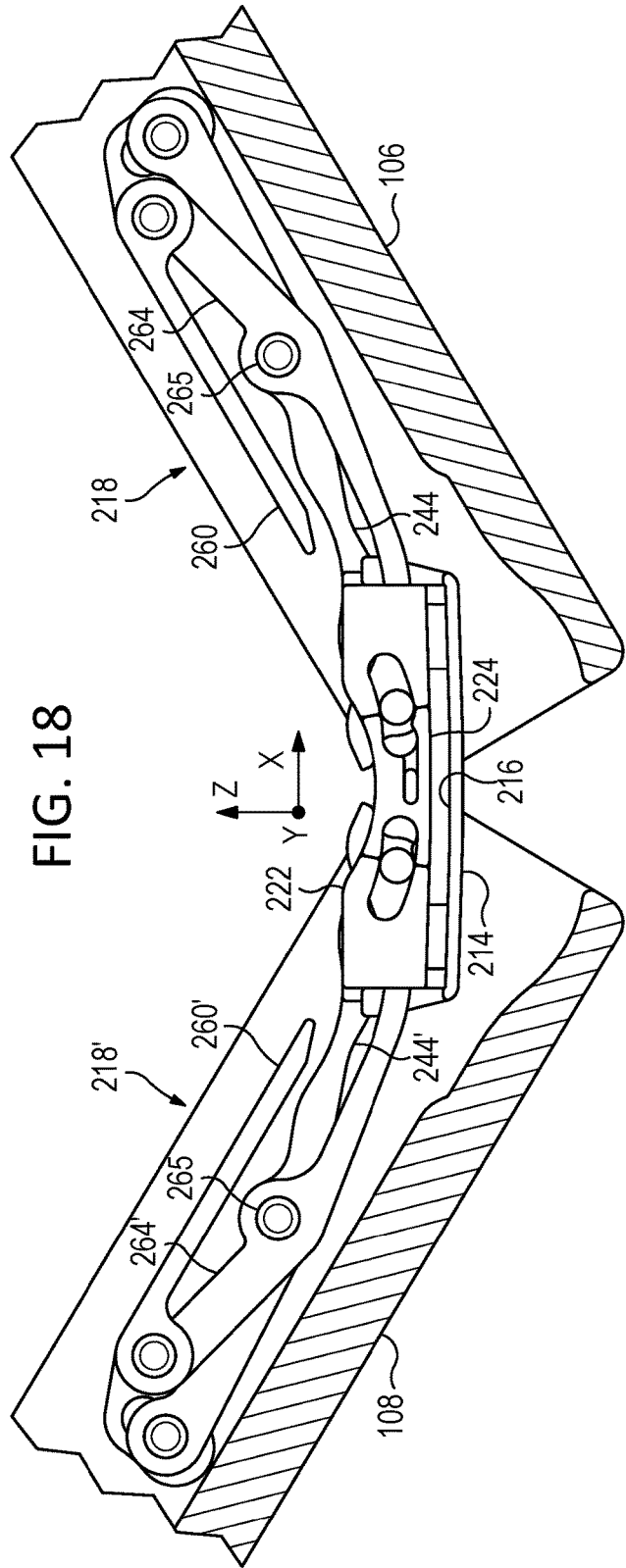

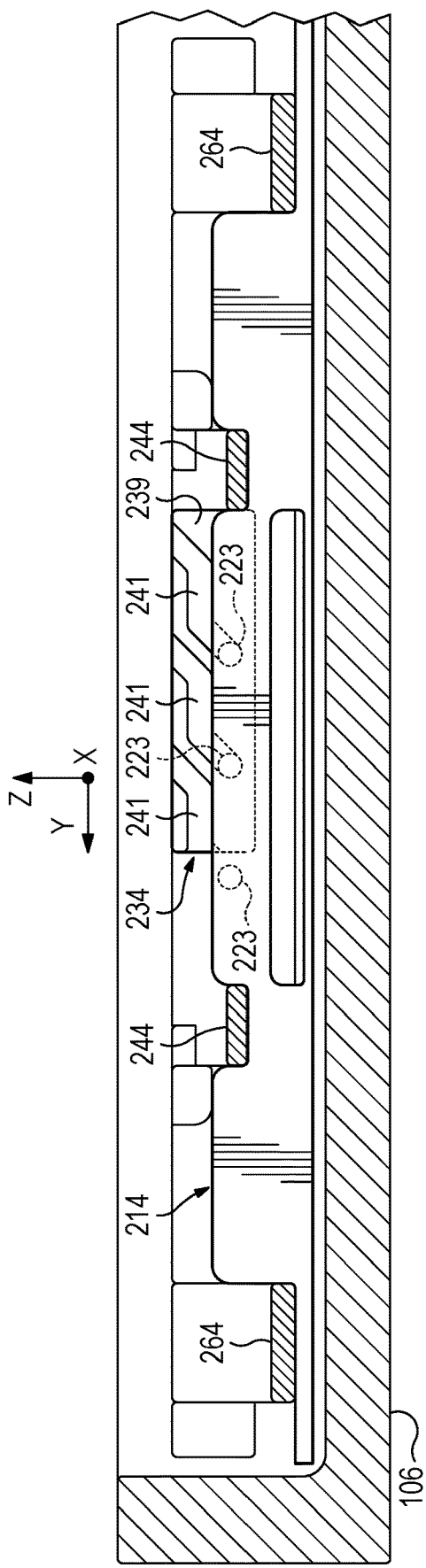
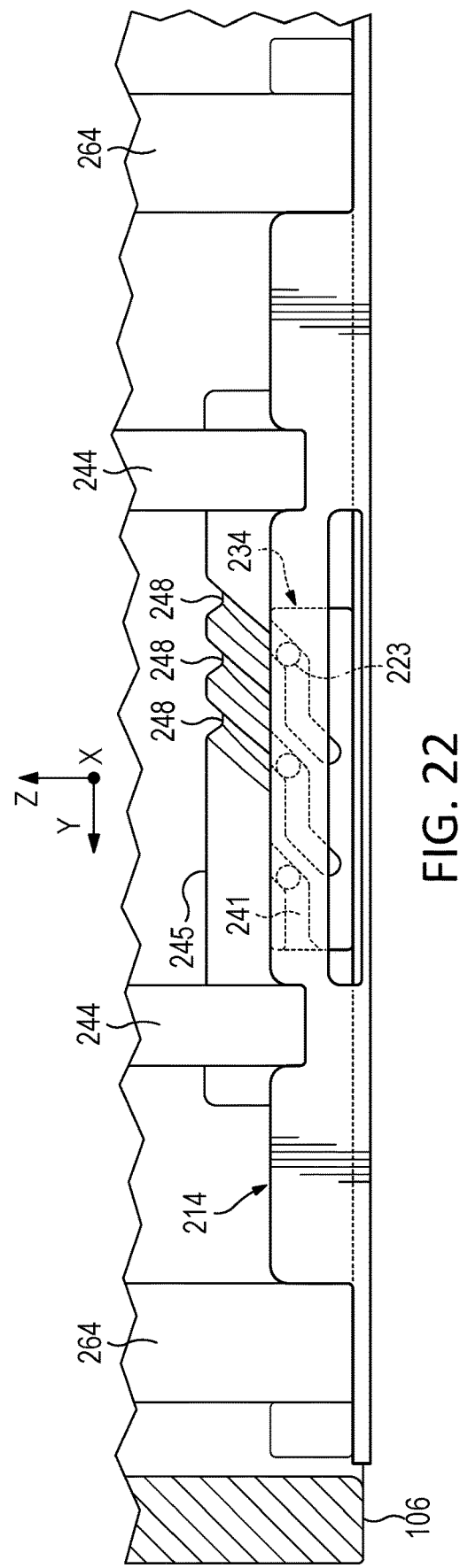
FIG. 21
FIG. 22

FOLDABLE COMPUTING DEVICE SPINE COVER PLATE

CROSS REFERENCE TO RELATED APPLICATIONS

This application is a continuation of International Patent Application Serial Number PCT/CN2022/116075, filed Aug. 31, 2022, the entirety of which is hereby incorporated herein by reference for all purposes.

BACKGROUND

Some foldable computing devices utilize a flexible display substrate that can deform as the device's display supports are folded.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed and further described below that relate to a moveable spine cover plate for covering a central spine in foldable computing devices. In one example, a foldable computing device comprises a first display-supporting frame that is rotatably coupled to a second display-supporting frame along a hinge axis via a hinge assembly comprising a central spine extending parallel to the hinge axis. A flexible display is supported by the first display-supporting frame and the second display-supporting frame. A spine cover plate extends over the central spine and is moveably coupled to the hinge assembly such that the spine cover plate is translated relative to the central spine in response to the first display-supporting frame being rotated relative to the second display-supporting frame.

Another example provides a method for retracting a spine cover plate in a foldable computing device. The foldable computing device comprises a first display-supporting frame rotatably coupled to a second display-supporting frame along a hinge axis via a hinge assembly that comprises a central spine extending parallel to the hinge axis. The first display-supporting frame and the second display-supporting frame support a flexible display. The method comprises translating the spine cover plate toward the central spine in response to the first display-supporting frame being rotated relative to the second display-supporting frame.

In another example, a foldable computing device comprises a first display-supporting frame rotatably coupled to a second display-supporting frame along a hinge axis via a hinge assembly comprising a central spine extending parallel to the hinge axis. A flexible display is supported by the first display-supporting frame and the second display-supporting frame. A spine cover plate extends over the central spine and is moveably coupled to the hinge assembly by a plurality of springs attached to opposing sides of the central spine, wherein the spine cover plate translates relative to the central spine as the first display-supporting frame is rotated relative to the second display-supporting frame.

BRIEF DESCRIPTION OF THE DRAWINGS

FIG. 7 shows a partial cutaway view taken along line 7-7 in FIG. 4 with the computing device in the end-to-end orientation according to examples of the present disclosure.

FIG. 8 shows the computing device of FIG. 7 partially folded between the end-to-end and face-to-face orientations according to examples of the present disclosure.

FIG. 16 shows an enlarged view of the spine cover plate and translatable bock of FIG. 15.

FIG. 17 shows a sidewall and slots of the translatable block of FIG. 15.

FIG. 18 shows a partial cutaway end view taken along line 18-18 in FIG. 12 with the computing device in the end-to-end orientation according to examples of the present disclosure.

FIG. 19 shows the computing device of FIG. 18 partially folded between the end-to-end and face-to-face orientations according to examples of the present disclosure.

FIG. 21 shows a partial cutaway view taken along line 21-21 in FIG. 12 showing the spine cover plate extended away from the hinge mechanism when the computing device is in the end-to-end orientation.

FIG. 22 shows the spine cover plate retracted when the computing device is in the face-to-face orientation according to examples of the present disclosure.

DETAILED DESCRIPTION

Some computing devices utilize a flexible display substrate that can deform as display supports beneath the flexible display are folded. In some of these devices, hinges couple two display supports for folding 180 degrees from an end-to-end (or open) orientation in which the flexible display is substantially planar to a face-to-face (or closed) orientation in which one portion of the flexible display is facing the opposing portion.

Some of these devices include a structure that extends along the folding axis of the two display supports and covers portions of the hinges. When the display supports are folded, significant gaps between the structure and the display supports can be exposed that allow ingress of dust, liquid and other undesirable materials into the computing device. Additionally, when the support surfaces are in the end-to-end orientation, the structure extends from the ends of the support surfaces to increase the width of the device. This configuration makes the device more difficult to grip and more cumbersome to manipulate with one hand. Additionally, the protruding structure creates gaps that allow ingress of undesirable materials into the computing device.

Accordingly, the present disclosure describes foldable computing devices that incorporate a retractable spine cover plate that translates relative to a central spine in a manner that reduces a width of the devices when folded and reduces or eliminates gaps to protect from entry of undesirable materials. As described in more detail below, computing devices of the present disclosure include a flexible display supported by first and second display-supporting frames. The first display-supporting frame is rotatably coupled to a second display-supporting frame along a hinge axis via a hinge assembly that comprises a central spine extending parallel to the hinge axis.

A spine cover plate extends over the central spine and is moveably coupled to the hinge assembly for translation relative to the central spine and the hinge axis as the first display-supporting frame is rotated relative to the second display-supporting frame. In different examples, a variety of mechanisms and components can be utilized to provide a net force that causes and/or assists with the translation of the spine cover plate. Non-limiting examples of such mechanisms and components include one or more resilient members, such as spring(s) and elastomeric component(s), and magnet assemblies. Advantageously, and as described in more detail below, by retracting the spine cover plate toward the central spine as the first display-supporting frame and the second display-supporting frame are rotated into a face-to-face orientation, the width of the folded computing device is reduced, thereby enabling easier and more comfortable handling of the device, such as with one hand. Additionally, configurations of the present disclosure help to prevent foreign material from entering the devices.

Figure 1:
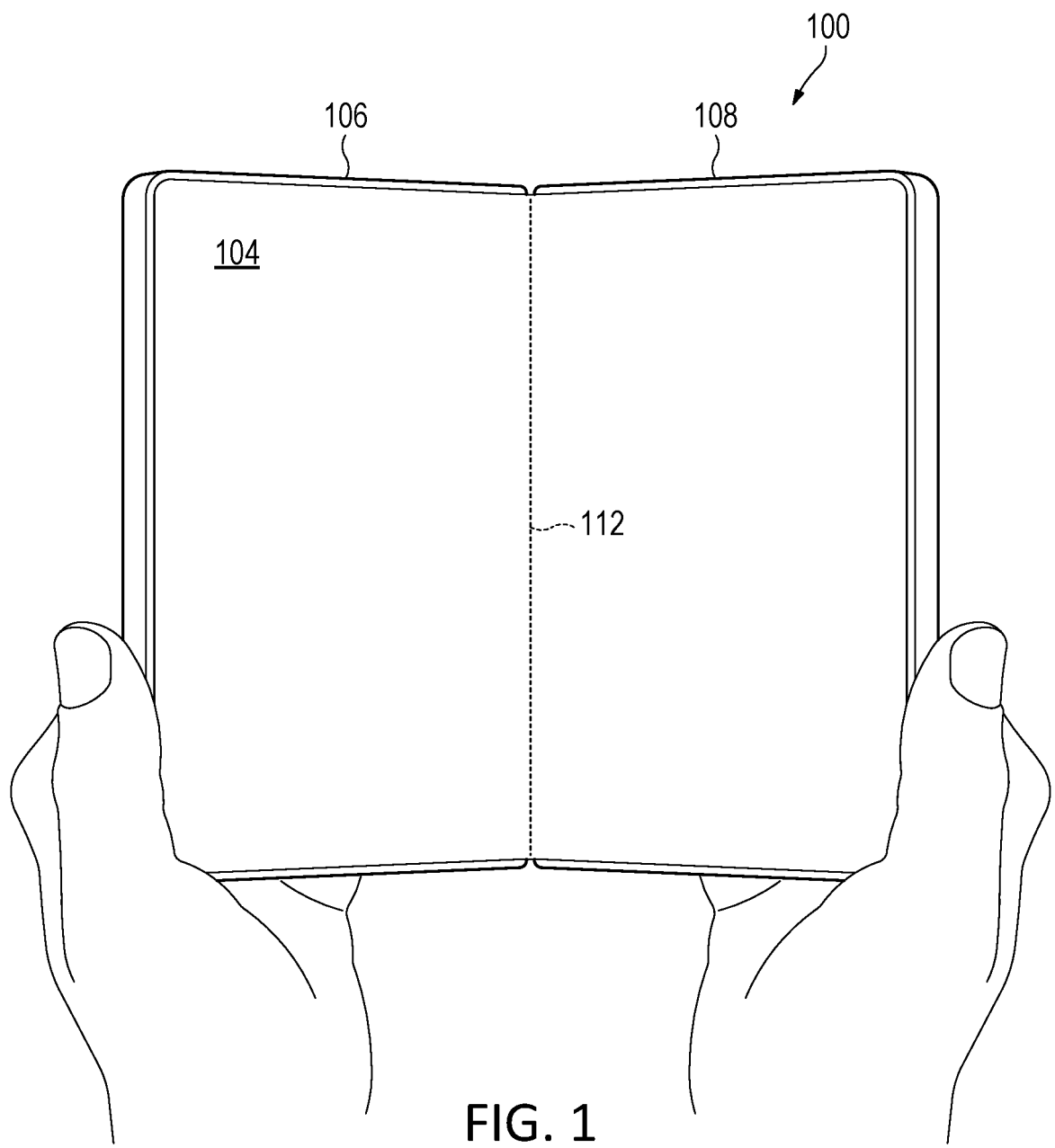
FIG. 1 shows a display side of one example of a foldable computing device utilizing a moveable spine cover plate according to examples of the present disclosure.

FIG. 1 shows one example of a foldable computing device 100 that may utilize spine cover plates according to different examples of the present disclosure. The foldable computing device 100 is foldable about a hinge axis 112. As described in more detail in the examples below, a first display-supporting frame 106 is rotatably coupled to a second display-supporting frame 108 along the hinge axis 112. A flexible display 104 is supported by the first display-supporting frame 106 and the second display-supporting frame 108. In this manner, the first display-supporting frame 106 and the second display-supporting frame 108 may be rotated between an end-to-end (open) orientation (see FIG. 3) and a face-to-face (closed) orientation (see FIG. 2), in which the flexible display 104 is folded in the interior of the device. In some examples, the first display-supporting frame 106 and second display-supporting frame 108 are rotatably coupled for 360 degrees of rotation relative to one another.

As described in more detail below, in different examples the foldable computing device 100 includes a hinge assembly that rotatably couples the first display-supporting frame 106 to the second display-supporting frame 108. The hinge assembly comprises a central spine that extends parallel to the hinge axis 112. As described in more detail below, and in one advantage of the present disclosure, a spine cover plate extends over the central spine and is moveably coupled to the hinge assembly for translation relative to the central spine as the first display-supporting frame 106 is rotated relative to the second display-supporting frame 108. While the following examples are described with reference to the foldable computing device of FIG. 1, in other examples the configurations of the present disclosure may be utilized with foldable computing devices having other sizes, shapes, capabilities, and/or form factors.

Figure 2:
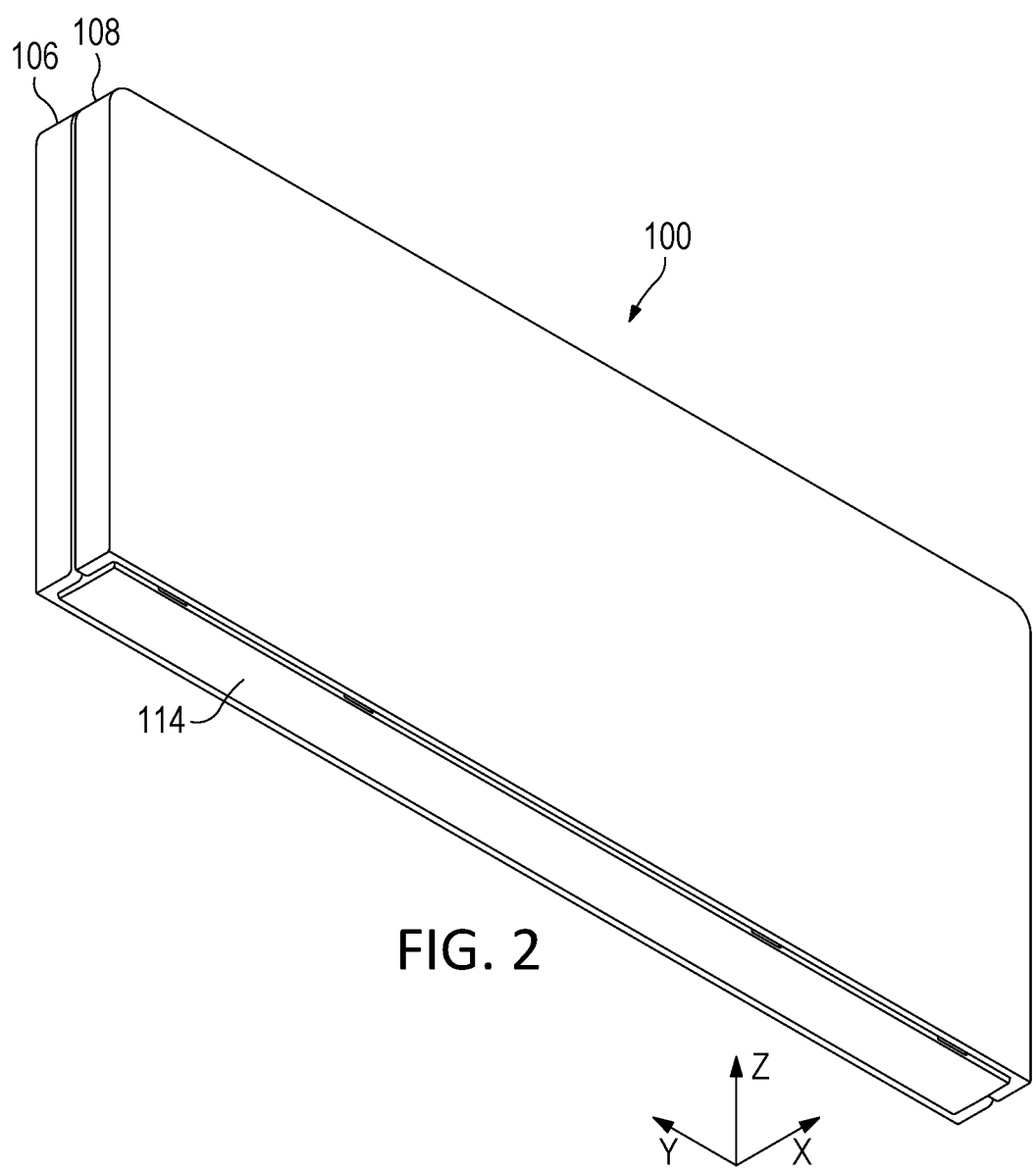
FIG. 2 shows the computing device of FIG. 1 folded in a face-to-face orientation.
Figure 3:
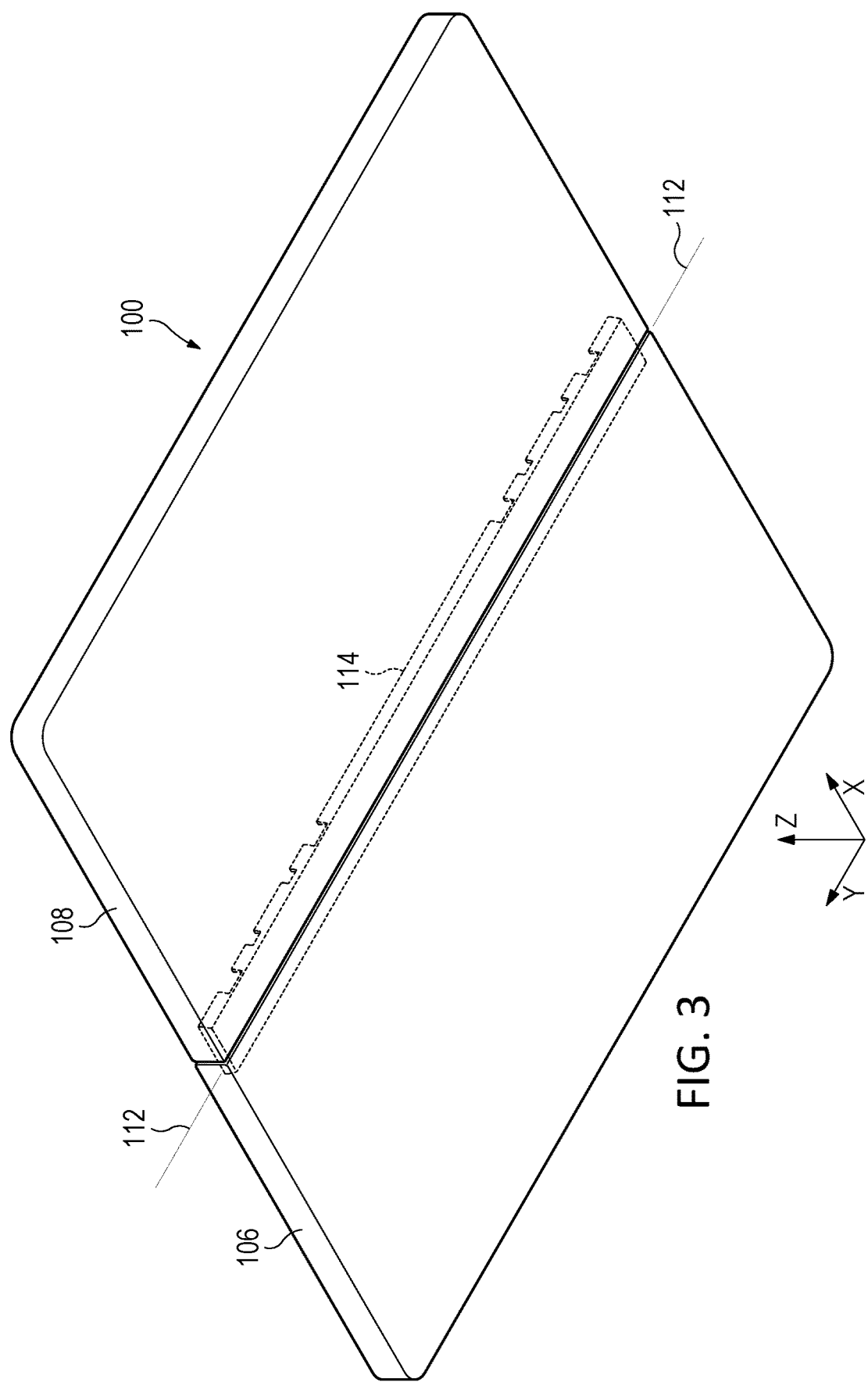
FIG. 3 shows the computing device of FIG. 1 opened into an end-to-end orientation.
Figure 9:
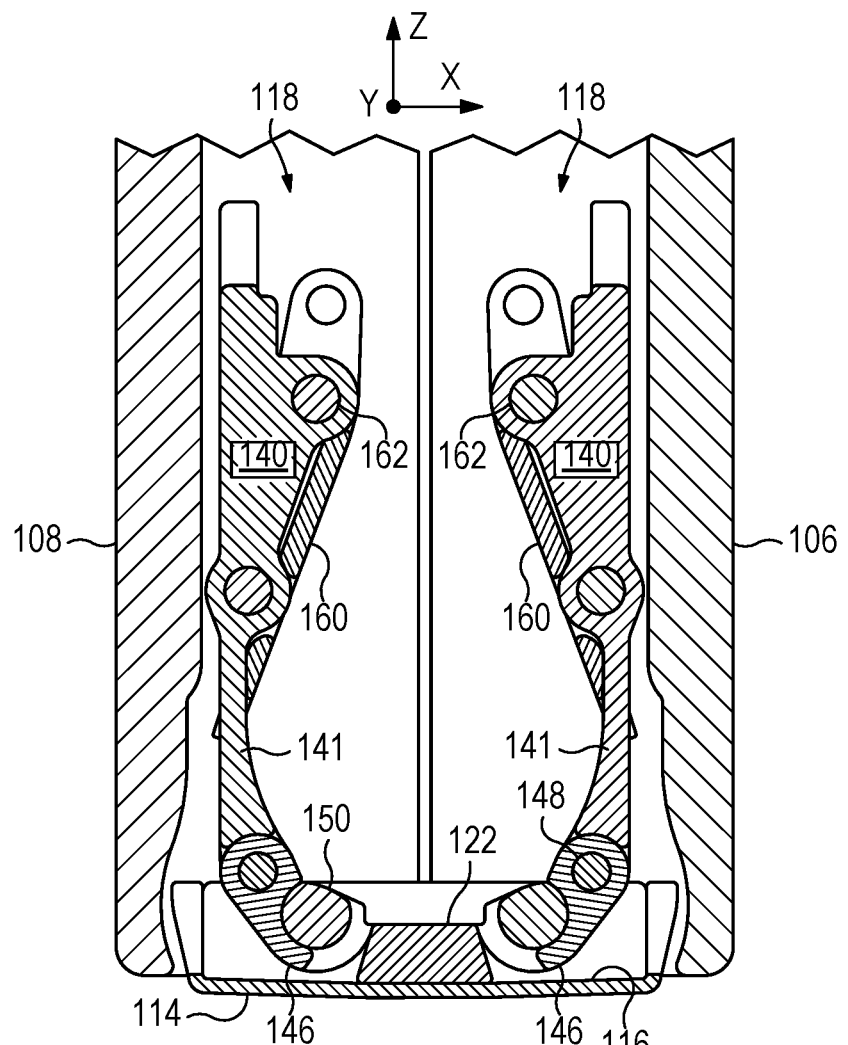
FIG. 9 shows the computing device of FIG. 7 in the face-to-face orientation according to examples of the present disclosure.

With reference now to FIGS. 2-11, one example of a foldable computing device 100 and spine cover plate 114 according to the present disclosure is provided. In this example and with reference to FIGS. 2-5, a spine cover plate 114 extends parallel to the hinge axis 112 and over the central spine 122 of the hinge assembly 117. As shown in FIGS. 2 and 9 and as described further below, when the foldable computing device 100 is in the face-to-face orientation with the flexible display (not shown) folded in the interior of the device, the spine cover plate 114 is in a retracted position to create a low-profile exterior of the foldable computing device 100. Advantageously and as noted above, by retracting the spine cover plate 114 toward the central spine 122 in this manner, the overall width of the device in this orientation is minimized, thereby enabling easier and more comfortable handling of the device, such as with one hand. Additionally, and as described further below, when the foldable computing device 100 is rotated between the face-to-face orientation and the end-to-end orientation shown in FIGS. 3 and 7, the spine cover plate 114 is translated away from the central spine 122 in a manner that reduces gaps between the sides 115, 119 of the spine cover plate 114 and interior surfaces 107, 109 of the first display-supporting frame 106 and the second display-supporting frame 108, respectively.

Figure 4:
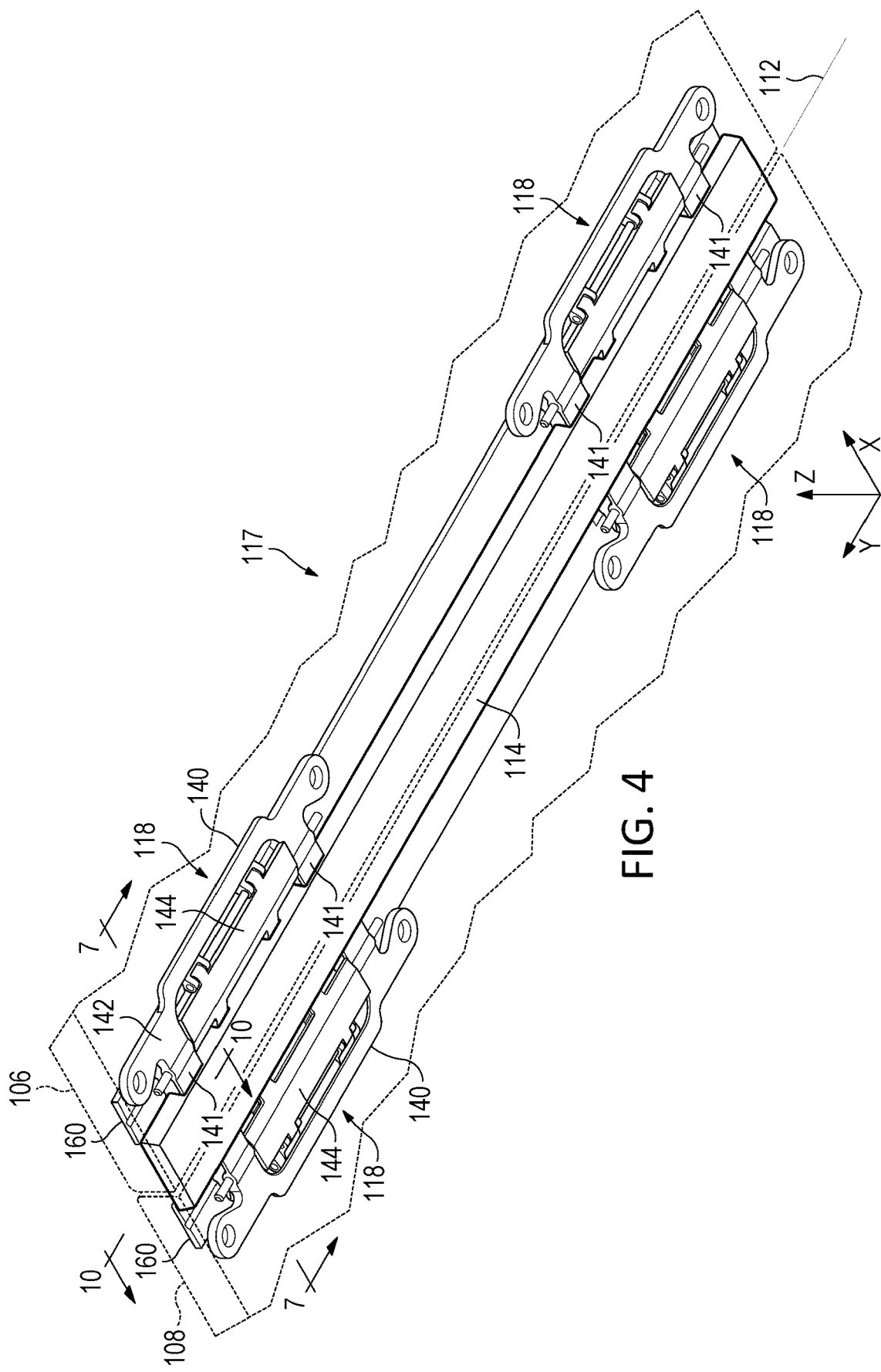
FIG. 4 shows a partial bottom perspective view of a spine cover plate and hinge assembly of the foldable computing device of FIG. 3 according to an example of the present disclosure.

With reference now to FIG. 4, in this example the hinge assembly 117 comprises two pairs of hinge mechanisms 118 positioned at opposing ends of the first display-supporting frame 106 and the second display-supporting frame 108. With reference also to FIGS. 5-9, each of the hinge mechanisms 118 comprises a four-bar linkage that enables movement of the first display-supporting frame 106 and the second display-supporting frame 108 relative to the central spine 122. In this example, each of the hinge mechanisms 118 includes a hinge link 140 that includes hinge link apertures 143 at opposing ends of the hinge link. In some examples, each hinge link aperture 143 receives a fastener, such as a screw (not shown), to affix the hinge link to the corresponding first display-supporting frame 106 or second display-supporting frame 108. In other examples, an outer bottom surface 142 of each hinge link 140 is affixed to the corresponding first display-supporting frame 106 or second display-supporting frame 108, such as via welding or an adhesive.

Each hinge link 140 is rotatably coupled to a first coupling member 144 that is located between the two hinge link apertures 143 of the hinge link. The hinge link 140 is also rotatably coupled to a second coupling member 146 via a hinge link arm 141 extending inwardly toward the hinge axis 112. With reference to FIGS. 4 and 7, each hinge link 140 is also rotatably coupled to a display support member 160 at display support pivot 162. As shown in FIG. 4 and in this example, in both the first display-supporting frame 106 and the second display-supporting frame 108, a display support member 160 extends substantially the length of the corresponding frame. As shown in FIGS. 7-9, these hinge mechanisms 118 guide the rotation of the first display-supporting frame 106 and second display-supporting frame 108 from the end-to-end orientation to the face-to-face orientation. Additionally, and as described in more detail below with respect to FIGS. 7-9, components of the hinge mechanisms 118 contact and translate the spine cover plate 114 toward and away from the central spine 122 as the first display-supporting frame 106 and second display-supporting frame 108 rotate relative to one another.

Figure 5:
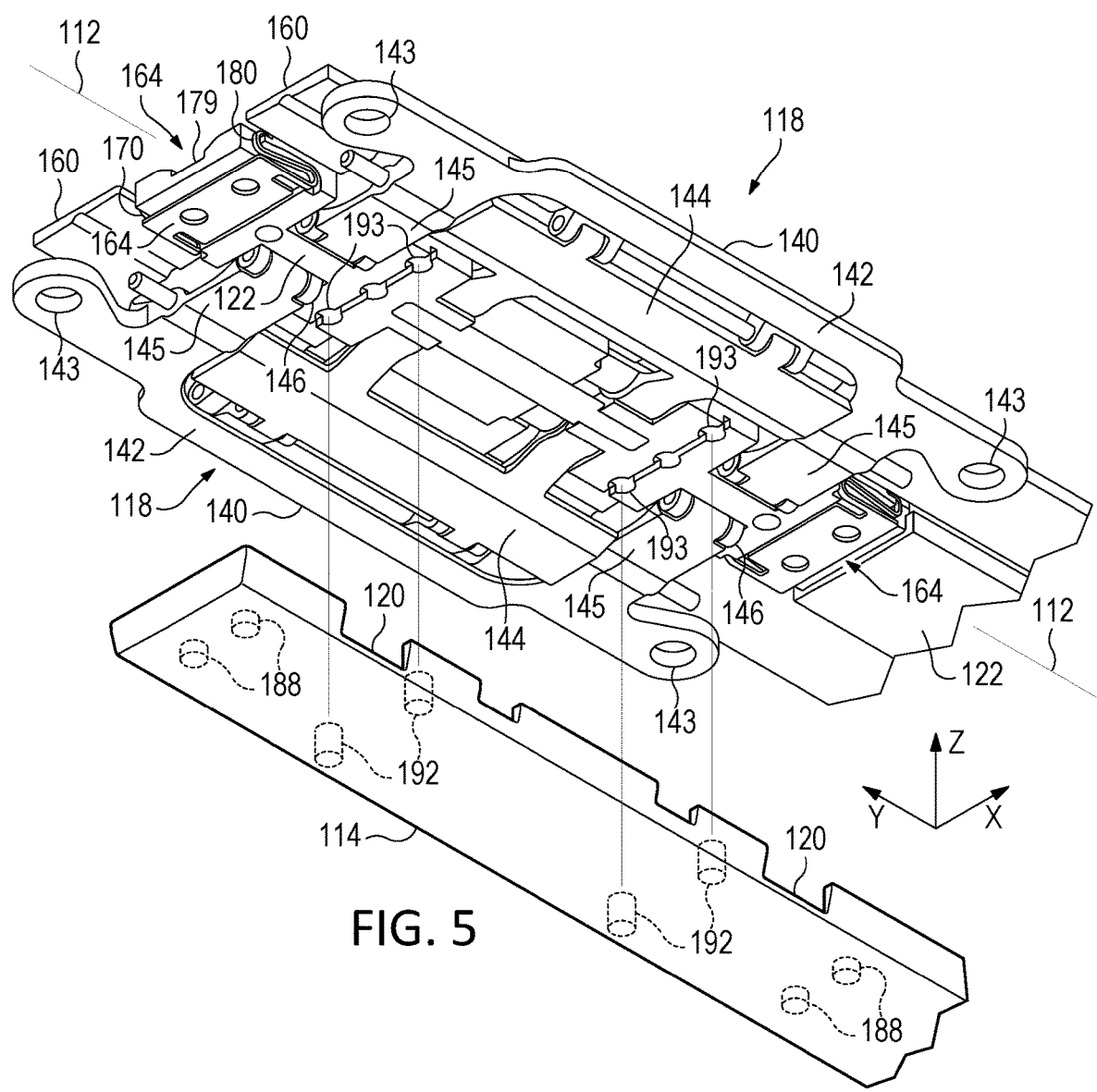
FIG. 5 shows a partial bottom and exploded perspective view of one end of the spine cover plate and hinge assembly of FIG. 4.

With reference now to FIG. 5, in this example the central spine 122 defines a plurality of spine guide apertures 193, and the spine cover plate 114 comprises a plurality of spine guide pins 192 moveably received within the spine guide apertures. Advantageously, the spine guide pins 192 cooperate with the spine guide apertures 193 to restrict and guide the movement of the spine cover plate 114 in the z-axis direction that is substantially perpendicular to the hinge axis 112. FIG. 5 is a partial view showing a portion of the central spine 122 and two hinge mechanisms 118 at one end of the hinge assembly 117. In some examples the spine cover plate 114 includes similar spine guide pins 192 that are moveably received within corresponding spine guide apertures 193 at the other end of the hinge assembly 117.

With reference to FIGS. 5-11, in this example the spine cover plate 114 is moveably coupled to the hinge assembly 117 by a plurality of resilient members. As described in more detail below, the plurality of resilient members bias the spine cover plate 114 toward the central spine 122 when the first display-supporting frame 106 and the second display-supporting frame 108 are in the end-to-end orientation. In this manner, the resilient members cause the spine cover plate 114 to retract inwardly toward the central spine 122 in a direction substantially perpendicular to the hinge axis 112 as the first display-supporting frame 106 and second display-supporting frame 108 are rotated from the end-to-end orientation of FIG. 7 to the face-to-face orientation of FIG. 9. Advantageously and as noted above, by retracting the spine cover plate 114 inwardly when the foldable computing device 100 is in the face-to-face orientation, the overall width of the device is reduced and a low-profile form factor that is more easily handled is provided.

Figure 6:
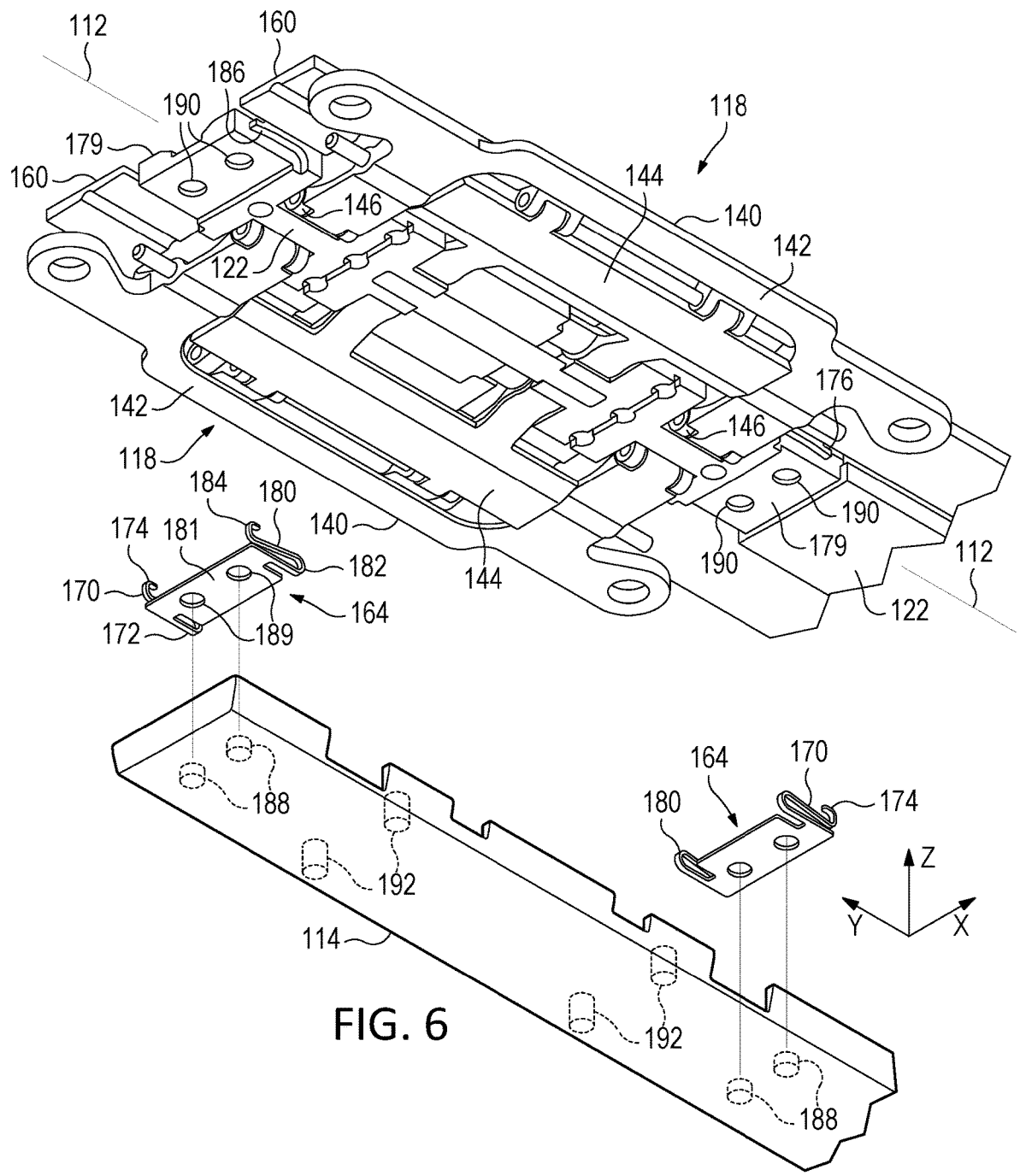
FIG. 6 shows a partial bottom and exploded perspective view of the spine cover plate and hinge assembly of FIG. 5.

With reference now to FIGS. 5 and 6, in this example the plurality of resilient members comprise a plurality of springs connected to the spine cover plate 114 and to anchor members of the central spine 122. In this example, the plurality of springs comprises a plurality of spring assemblies 164 that each include a first spring 170 and a second spring 180 that are connected by a base portion 181 extending between the first spring and the second spring. As described further below, and one potential advantage of this example, the first spring 170 and second spring 180 are attached to anchor surfaces on opposing sides of the hinge axis 112 to provide balanced biasing forces to the hinge cover plate 114 that are evenly distributed relative to the central hinge axis. With reference to FIGS. 4 and 5, at each pair of hinge mechanisms 118 two spring assemblies 164 are located between the hinge mechanisms and are centered along the hinge axis 112. As shown in FIG. 5, one of the spring assemblies 164 is located at a first end of the central spine 122 and a first end of the spine cover plate 114 and the other spring assembly 164 is spaced from the first spring assembly along the hinge axis 112. Two other spring assemblies 164 are similarly configured and located at the opposite end of the central spine 122 and between the other two hinge mechanisms 118.

Figure 10:
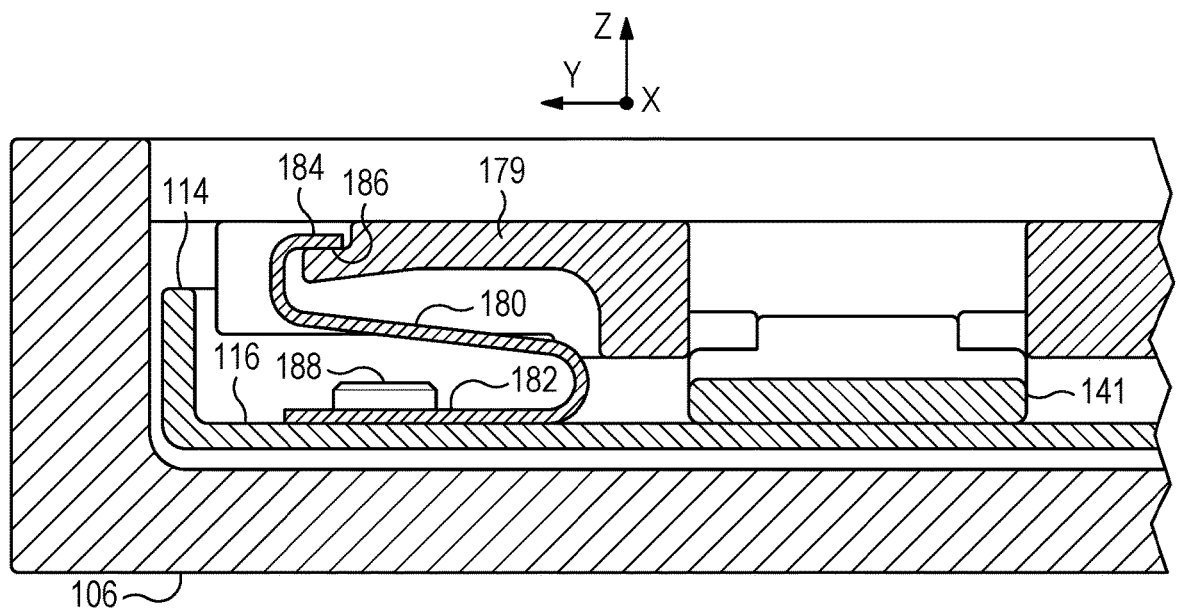
FIG. 10 is a partial cutaway view taken along line 10-10 in FIG. 4 showing a spring that moveably couples the spine cover plate to a hinge mechanism of the hinge assembly according to examples of the present disclosure.
Figure 11:
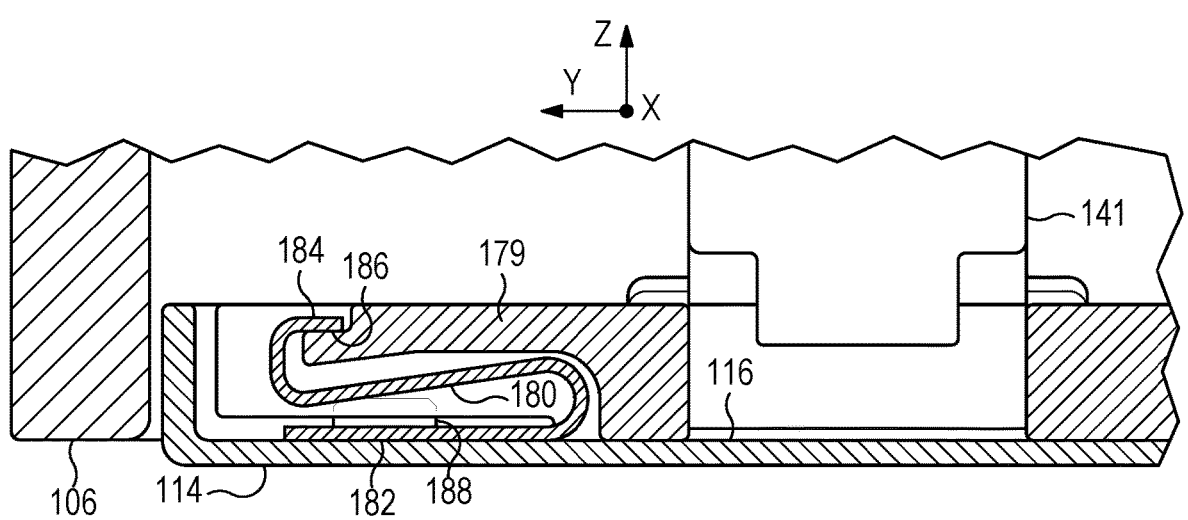
FIG. 11 shows the spine cover plate of FIG. 10 retracted towards the hinge mechanism when the computing device is in the face-to-face orientation according to examples of the present disclosure.

The following description of a spring assembly 164 and anchor member 179 is applicable to each of the spring assemblies 164 and anchor members 179 in this example. With reference to FIG. 6, and as noted above, each spring assembly 164 comprises a first spring 170 and a second spring 180 connected by a base portion 181 extending between the two springs. With reference also to FIGS. 5 and 10-11, a first end 172 of the first spring 170 contacts the spine cover plate 114, and a second end 174 of the first spring contacts a first anchor surface 176 of an anchor member 179 of the central spine 122. Similarly for the second spring 180, a first end 182 of the second spring contacts the spine cover plate 114, and a second end 184 of the second spring contacts a second anchor surface 186 of the anchor member 179. For example, FIGS. 10 and 11 show a partial cutaway view taken along line 10-10 in FIG. 4 showing the first end 182 of the second spring 180 contacting the inner surface 116 of the spine cover plate 114. As noted above, the first end 172 of the first spring 170 similarly contacts the inner surface 116 of the spine cover plate.

With reference also to FIGS. 5 and 6, in this configuration the second end 174 of the first spring 170 attaches to the first anchor surface 176 on a first side of the hinge axis 112, and the second end 184 of the second spring 180 attaches to the second anchor surface 186 on a second side of the hinge axis opposite to the first side. Accordingly, and in another potential advantage of the present disclosure, by attaching the first spring 170 and second spring 180 to anchor surfaces on opposing sides of the hinge axis 112, the spring assemblies 164 provide balanced biasing forces to the hinge cover plate 114 that are evenly distributed relative to the central hinge axis.

With reference again to FIG. 6, in some examples the base portion 181 of each spring assembly 164 is affixed to the inner surface 116 of the spine cover plate 114, such as by laser welding or utilizing an adhesive to bond the base portion to the inner surface. In some examples, the first end 172 of the first spring 170 and the first end 182 of the second spring 180 are also affixed to the inner surface 116 of the spine cover plate 114. In some examples and with reference also to FIG. 10, each spring assembly 164 is affixed to the spine cover plate 114 via interference fits between spring assembly guide pins 188 that extend upwardly from the inner surface 116 of the spine cover plate and corresponding spring assembly guide apertures 189 formed in the base portion 181 of the spring assembly. Additionally, and as depicted in FIGS. 5, 6 and 10, and 11, the spring assembly guide pins 188 are moveably received in anchor member clearance apertures 190 defined in the anchor members 179 to thereby allow the spine cover plate 114 to retract towards the anchor members and central spine 122 as the first display-supporting frame 106 and second display-supporting frame 108 are rotated between the end-to-end orientation (shown in FIGS. 7 and 10) and the face-to-face orientation (shown in FIGS. 9 and 11), and to extend away from the anchor members and central spine as the first display-supporting frame 106 and second display-supporting frame 108 are rotated between the face-to-face orientation and the end-to-end orientation.

FIGS. 10 and 11 also show the second end 184 of the second spring 180 contacting the second anchor surface 186 of the anchor member 179. As depicted in FIGS. 5-7 and 10, with the first display-supporting frame 106 and second display-supporting frame 108 in the end-to-end orientation, the first spring 170 and second spring 180 are biasing the spine cover plate 114 toward the anchor member 179. As shown in FIG. 7, in this orientation a gap 166 exists between the spine cover plate 114 and the outer surface 124 of the central spine 122. Also as shown in FIG. 7 and with reference also to FIG. 5, a contacting surface 145 of each of the hinge link arms 141 of each hinge link 140 contacts a cutout surface 120 in the spine cover plate 114 to maintain the gap 166 and prevent the spine cover plate from translating towards the central spine 122.

With reference now to FIG. 8, as the first display-supporting frame 106 and second display-supporting frame 108 are rotated from the end-to-end orientation toward the face-to-face orientation, the spring assemblies 164 cause the spine cover plate 114 to translate toward the central spine 122 in the z-axis direction, with a rounded surface 147 of the second coupling member 146 contacting and controlling the translation as second coupling member rotates around the pivot bar 150. As shown in this intermediate orientation, the gap 166 of FIG. 7 has been partially closed. Additionally, and in another potential advantage of the present disclosure, in this orientation the sides 115, 119 of the spine cover plate 114 are closely adjacent to the corresponding interior surfaces 107, 109 of the first display-supporting frame 106 and the second display-supporting frame 108, respectively. In this manner, any gaps between these surfaces are reduced to protect from ingress of foreign materials. In some examples, gaps of approximately 200 microns are present between the sides 115, 119 and the corresponding interior surfaces 107, 109.

In some examples, the sides 115, 119 of the spine cover plate 114 contact the corresponding interior surfaces 107, 109 of the first and second display-supporting frame 106, 108 at one or more orientations between the end-to-end and face-to-face orientations. In these examples, a compliant layer of material, such as silicone rubber, may be added to the interior surfaces 107, 109 and/or to the sides 115, 119.

With reference now to FIGS. 9 and 11, when the first display-supporting frame 106 and second display-supporting frame 108 are in the face-to-face orientation, the spring assemblies 164 have caused the spine cover plate 114 to retract into and contact the central spine 122. Advantageously, by retracting the spine cover plate 114 toward the central spine 122 when the foldable computing device is in the face-to-face orientation, any protrusion of the spine cover plate beyond the ends of the first display-supporting frame 106 and second display-supporting frame 108 is reduced or eliminated, thereby also reducing the overall width of the folded computing device to enable easier and more comfortable handling of the device, such as with one hand. Additionally, this configuration reduces any gaps between the spine cover plate 114 and the first and second display-supporting frames 106, 108 when the foldable computing device is in the face-to-face orientation and during rotation of the frames between orientations, to thereby discourage foreign material from entering the device.

With reference now to FIGS. 12-22, another example is provided of a foldable computing device that includes a spine cover plate extending over a central spine and moveably coupled to a hinge assembly for translation relative to the central spine according to examples of the present disclosure. As described in more detail below, in this example the spine cover plate is moveably coupled to a translatable block of the hinge assembly via protrusions extending inwardly from the spine cover plate into slots defined in the sidewalls of the translatable block. Rotating the first display-supporting frame relative to the second display-supporting frame causes the block to translate parallel to the hinge axis. Ramp surfaces in the slots of the block contact the protrusions to cause the spine cover plate to translate in a direction substantially perpendicular to the hinge axis, either toward or away from the central spine.

In some examples the foldable computing device 100 of FIG. 1 can utilize the spine cover plate and other components described below. In other examples, these configurations can be utilized with foldable computing devices having other sizes, shapes, capabilities, and/or form factors.

Figure 12:
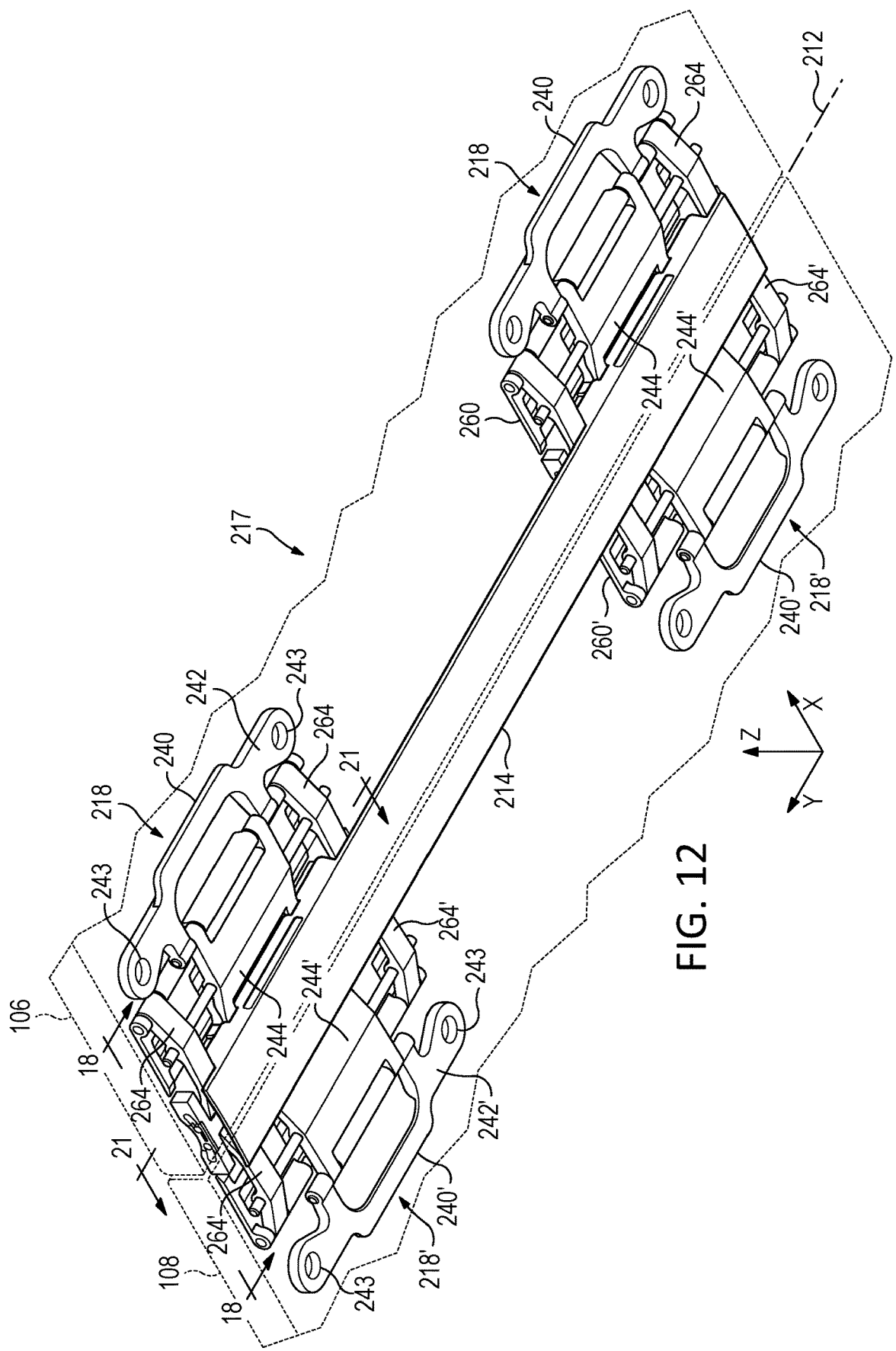
FIG. 12 shows a partial bottom perspective view of another example of a spine cover plate and hinge assembly that can be utilized with the foldable computing device of FIG. 1.
Figure 13:
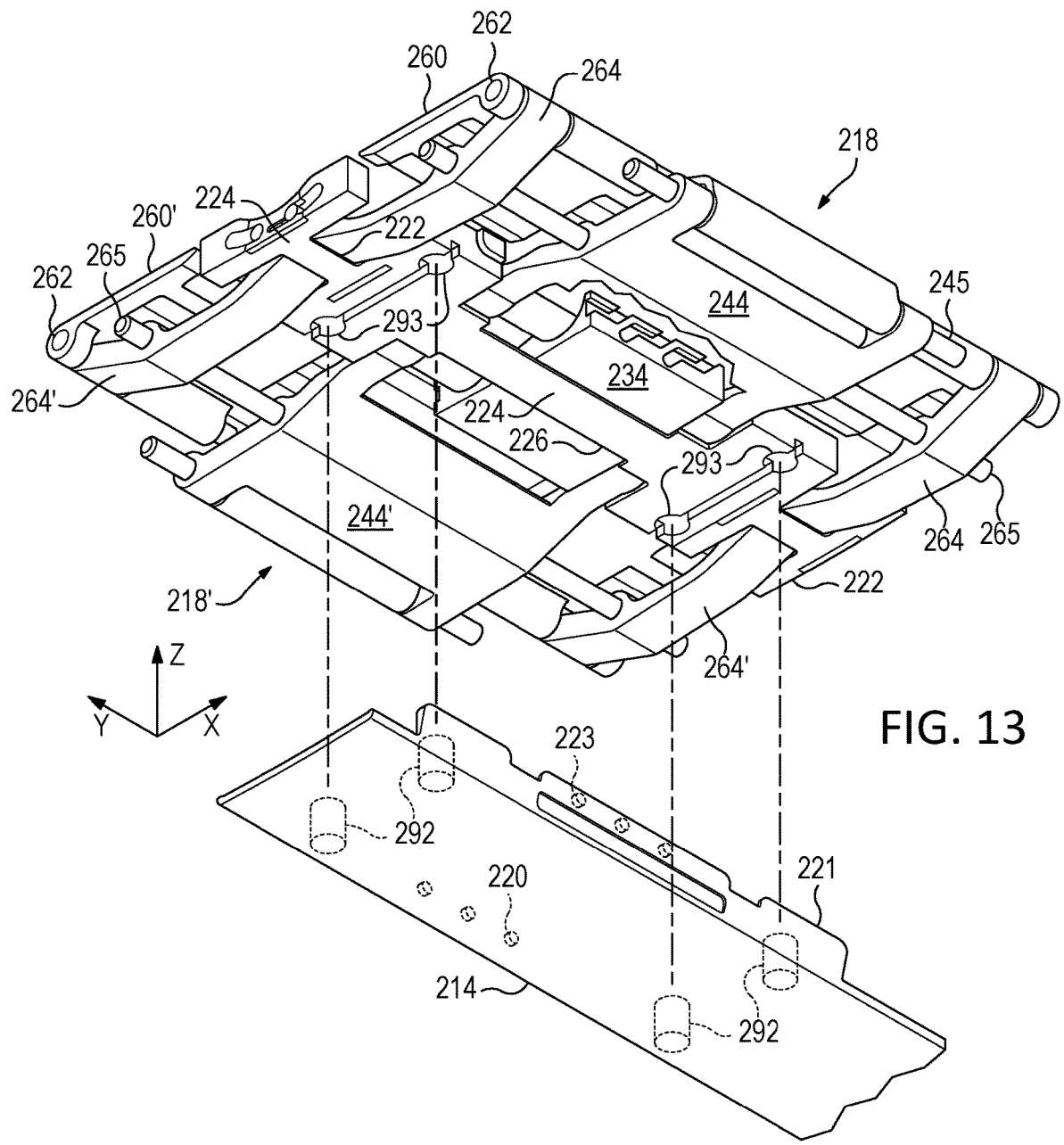
FIG. 13 shows a partial bottom and exploded perspective view of one end of the spine cover plate and hinge assembly of FIG. 12.
Figure 14:
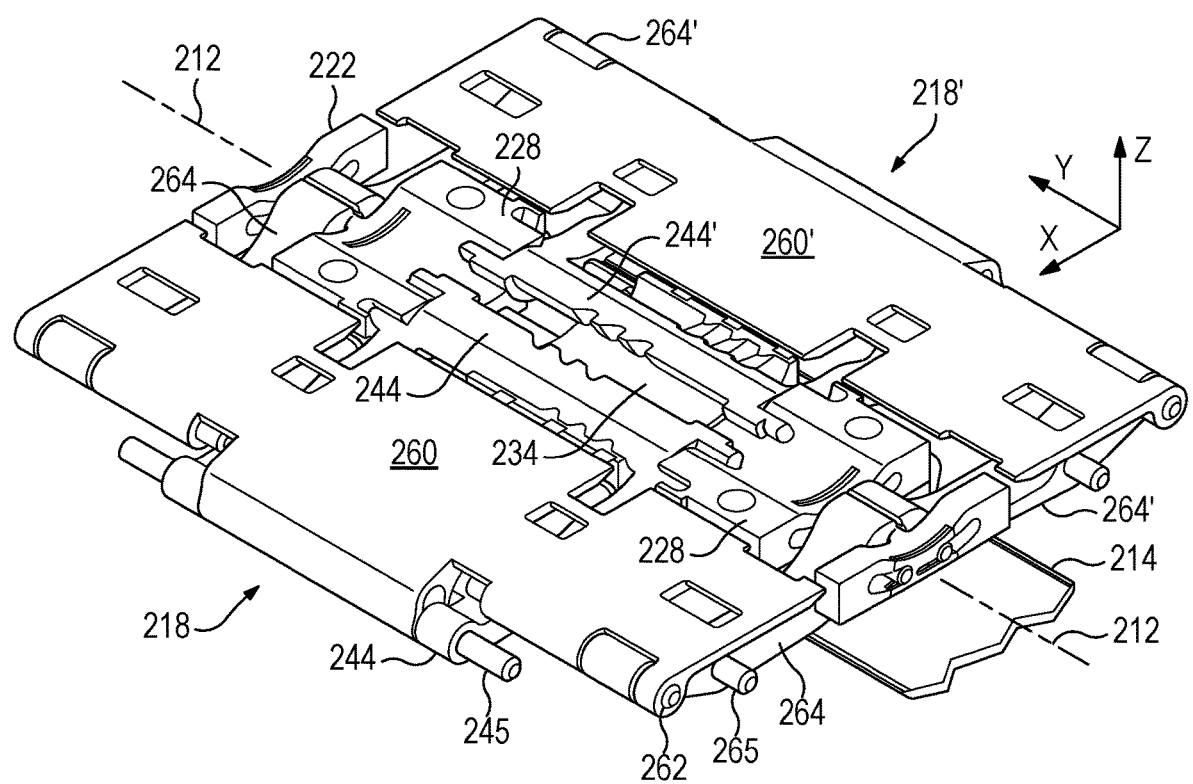
FIG. 14 shows a partial top perspective view of the spine cover plate and hinge mechanisms of the hinge assembly of FIG. 13.

With reference now to FIGS. 12 and 13, in this example a spine cover plate 214 extends parallel to the hinge axis 212 and over the central spine 222 of the hinge assembly 217. Like the example described above, in this example the hinge assembly 217 comprises two pairs of hinge mechanisms 218, 218' positioned at opposing ends of the first display-supporting frame 106 and the second display-supporting frame 108. Each of the hinge mechanisms 218, 218' has the same configuration and components. For ease of description, the following denotes the two hinge mechanisms connected to the first display-supporting frame 106 as 218, and the opposing two hinge mechanisms connected to the second display-supporting frame 108 as 218'.

With reference also to FIGS. 14-15 and 18-20, each of the hinge mechanisms 218, 218' comprises rotatably-coupled members that enable movement of the first display-supporting frame 106 and the second display-supporting frame 108 relative to the central spine 222. In this example and with reference to FIG. 12, each of the hinge mechanisms 218, 218' includes a hinge link 240, 240' that includes hinge link apertures 243 at opposing ends of the hinge link. In some examples, each hinge link aperture 243 receives a fastener, such as a screw (not shown), to affix the hinge link to the corresponding first display-supporting frame 106 or second display-supporting frame 108. In other examples, an outer bottom surface 242, 242' of each hinge link 240, 240' is affixed to the corresponding first display-supporting frame 106 or second display-supporting frame 108, such as via welding or an adhesive.

Figure 15:
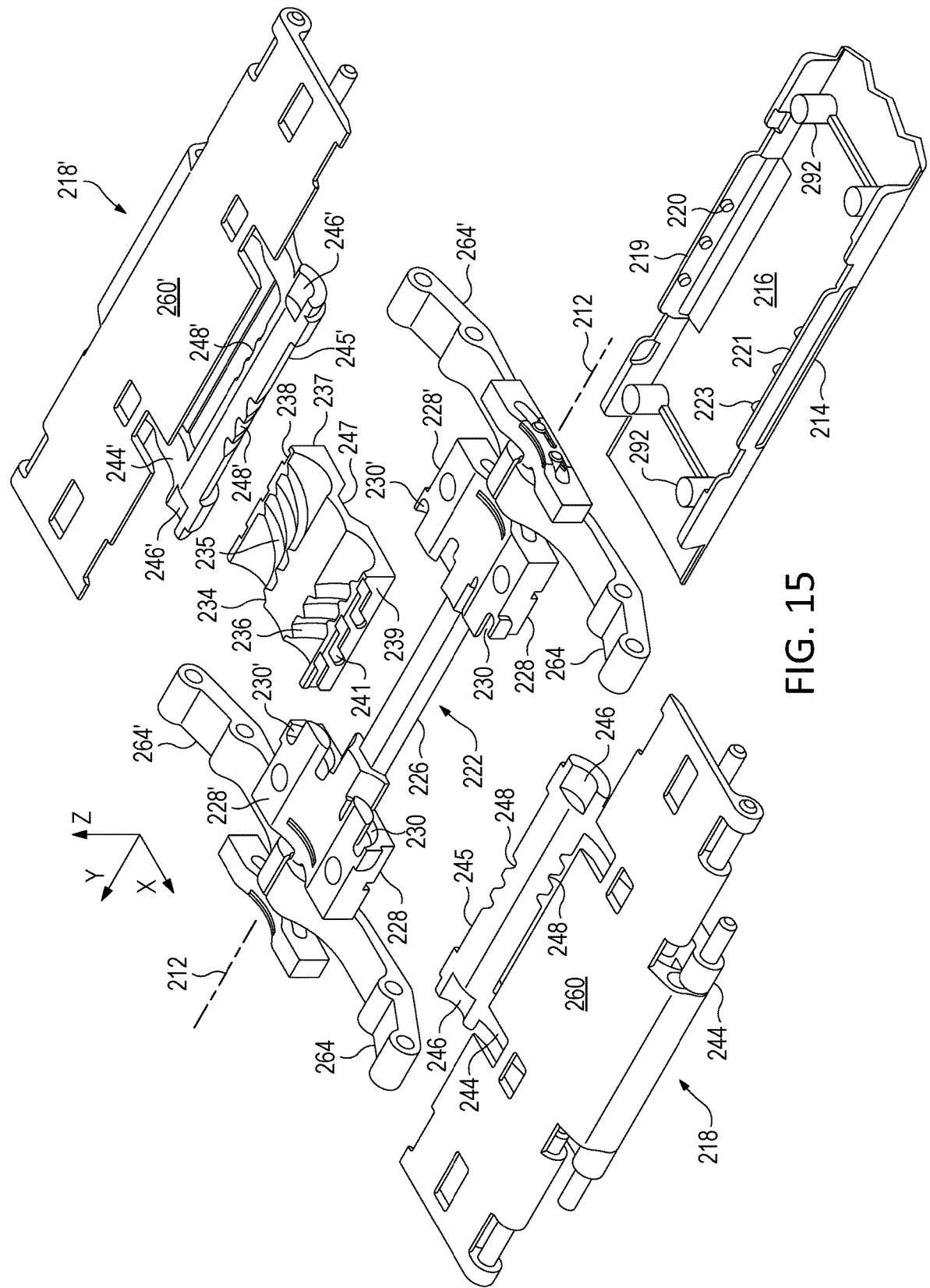
FIG. 15 shows an exploded view of the partial spine cover plate and hinge mechanisms of FIG. 14.

Each hinge link 240, 240' is rotatably coupled to a first coupling member 244, 244' that is located between the two hinge link apertures 243 of the hinge link. As described in more detail below, the first coupling members 244, 244' include an elongated member 245, 245' that features helical grooves 248, 248' that mate with corresponding helical grooves 235, 236 in the translatable block 234 to translate the block as the first display-supporting frame 106 and second display-supporting frame 108 are rotated relative to one another. With reference to FIG. 15, the elongated members 245, 245' also include arcuate bearing surfaces 246 and 246' that are moveably received within corresponding inwardly facing arcuate grooves 230, 230' located in opposing end structures 228, 228' to guide the movement of the first coupling members 244, 244'. Each hinge link 240, 240' is also rotatably coupled to a pair of connector arms 264, 264' via a pivot bar 265, with the connector arms also rotatably coupled to the central spine 222. Each hinge link 240, 240' is also rotatably coupled to a display support member 260, 260' at display support pivot 262.

Figure 20:
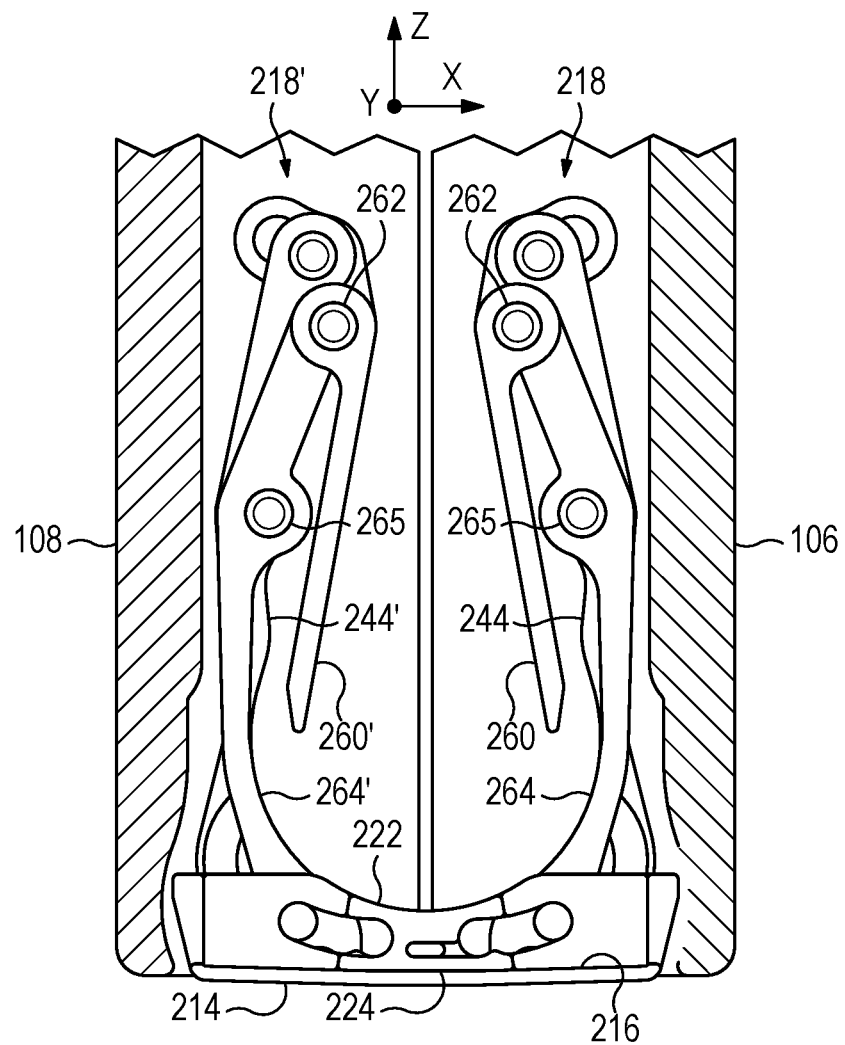
FIG. 20 shows the computing device of FIG. 18 in the face-to-face orientation according to examples of the present disclosure.

As shown in FIGS. 18-20, these hinge mechanisms 218, 218' guide the rotation of the first display-supporting frame 106 and second display-supporting frame 108 between the end-to-end orientation and the face-to-face orientation. Additionally, and as described in more detail below, components of the translatable block 234 contact and translate the spine cover plate 114 toward and away from the central spine 122 as the first display-supporting frame 106 and second display-supporting frame 108 rotate relative to one another.

With reference now to FIG. 13, in this example the central spine 122 defines a plurality of spine guide apertures 293, and the spine cover plate 214 comprises a plurality of spine guide pins 292 moveably received within the spine guide apertures. Advantageously, the spine guide pins 292 cooperate with the spine guide apertures 293 to guide the movement of the spine cover plate 214 in the z-axis direction that is substantially perpendicular to the hinge axis 212. FIG. 13 is a partial view showing a portion of the central spine 222 and two hinge mechanisms 218, 218' at one end of the hinge assembly 217. In some examples the spine cover plate 214 includes similar spine guide pins 292 that are moveably received within corresponding spine guide apertures 293 at the other end of the hinge assembly 217.

As noted above and described further below, slots in the translatable block 234 cooperate with protrusions on the spine cover plate 214 to cause the spine cover plate to retract inwardly toward the central spine 122 in a direction substantially perpendicular to the hinge axis 112 as the first display-supporting frame and second display-supporting frame are rotated from the end-to-end orientation of FIG. 18 to the face-to-face orientation of FIG. 20. Advantageously and as noted above, by retracting the spine cover plate 214 inwardly when the foldable computing device is in the face-to-face orientation, the overall width of the device is reduced and a low-profile form factor that is more easily handled is provided.

In this example and with reference to FIG. 15, the translatable block 234 includes a sliding surface 247 that is slidably received on an elongated bar 226 of the central spine 222 to enable the translatable block to translate in the y-axis direction. As noted above, the translatable block 234 includes a first set of block helical grooves 235 and a second set of block helical grooves 236 on the opposite side of the block. The first set of block helical grooves 235 mates with corresponding elongated member helical grooves 248' of the elongated members 245', and the second set of block helical grooves 236 mates with corresponding elongated member helical grooves 248 of the elongated members 245. Accordingly, as the first display-supporting frame 106 and second display-supporting frame 108 are rotated relative to one another, the mating helical grooves operate in a manner similar to a lead screw to translate the translatable block 234 along the elongated bar 226.

With reference to FIGS. 15-17, the translatable block 234 includes a first block sidewall 237 in which a plurality of first block sidewall slots 238 are defined. Similarly, the translatable block 234 includes a second block sidewall 239 opposite the first block sidewall 237 in which a plurality of second block sidewall slots 241 are defined. As shown in FIG. 17, each of the second block sidewall slots 241 includes a first ramp surface 250 and a second ramp surface separated by a level surface 254. The first block sidewall slots 238 have the same configuration as the second block sidewall slots 241.

The spine cover plate 214 includes a first plate sidewall 219 that includes a plurality of first follower protrusions 220 extending inwardly from the first plate sidewall. Similarly, the spine cover plate 214 includes a second plate sidewall 221 that includes a plurality of second follower protrusions 223 extending inwardly from the second plate sidewall. With reference to FIGS. 14-16 and 21-22, the first follower protrusions 220 extend into the first block sidewall slots 238 and the second follower protrusions 223 extend into the second block sidewall slots 241 of the translatable block 234.

With reference to FIGS. 15, 18, and 21, when the first display-supporting frame 106 and second display-supporting frame 108 are in the end-to-end orientation, a gap 266 exists between the spine cover plate 214 and the outer surface 224 of the central spine 222 (see FIG. 18). As the first display-supporting frame 106 and second display-supporting frame 108 are rotated from the end-to-end orientation toward the face-to-face orientation of FIG. 20, the translatable block 234 is moved in the positive Y-axis direction, and the first and second ramp surfaces 250, 252 contact the first and second follower protrusions 220, 223 to cause the spine cover plate to translate in the positive Z-axis direction and retract toward the central spine 222. As shown in FIG. 22, when the first display-supporting frame 106 and second display-supporting frame 108 are in the face-to-face orientation of FIG. 20, the second follower protrusions 223 have been moved to upper portions of the second block sidewall slots 241, and the first follower protrusions 220 similarly have been moved to upper portions of the first block sidewall slots 238. Also as shown in FIG. 20, the gap 266 of FIG. 18 has been closed and the spine cover plate 214 has been retracted such that its inner surface 216 is contacting the outer surface 224 of the central spine 222.

Accordingly, and in one advantage of this configuration, by retracting the spine cover plate 214 toward the central spine 222 when the foldable computing device is in the face-to-face orientation, any protrusion of the spine cover plate beyond the ends of the first display-supporting frame 106 and second display-supporting frame 108 is reduced or eliminated. In this manner, the overall width of the folded computing device is also reduced to enable easier and more comfortable handling of the device, such as with one hand. Additionally, this configuration helps to minimize any gaps between the spine cover plate 114 and the first and second display-supporting frames 106, 108 when the foldable computing device is in the face-to-face orientation and during rotation of the frames between orientations, to thereby discourage foreign material from entering the device.

Figure 23:
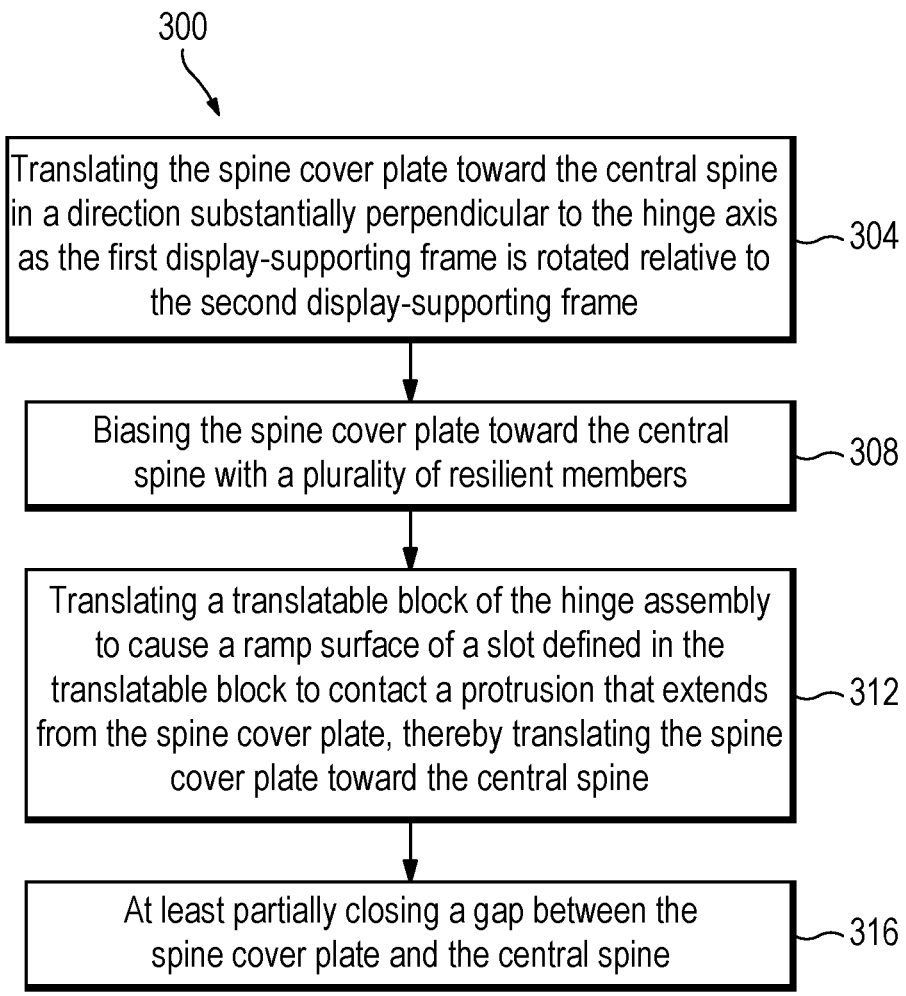
FIG. 23 shows a flow diagram of a method for retracting a spine cover plate in a foldable computing device according to examples of the present disclosure.

With reference now to FIG. 23, an example method 300 for retracting a spine cover plate in a foldable computing device will now be described. The following description of method 300 is provided with reference to the examples and components described herein and shown in FIGS. 1-22. For example, the method 300 may be performed using the components of any of the examples of foldable computing devices described herein.

It will be appreciated that following description of method 300 is provided by way of example and is not meant to be limiting. Therefore, it is to be understood that method 300 may include additional and/or alternative steps relative to those illustrated in FIG. 23. Further, it is to be understood that the steps of method 300 may be performed in any suitable order. Further still, it is to be understood that one or more steps may be omitted from method 300 without departing from the scope of this disclosure. It will also be appreciated that method 300 also may be performed in other contexts using other suitable components.

With reference to FIG. 23, the method 300 is described in conjunction with a foldable computing device comprising a first display-supporting frame rotatably coupled to a second display-supporting frame along a hinge axis via a hinge assembly comprising a central spine extending parallel to the hinge axis. A flexible display is supported by the first display-supporting frame and the second display-supporting frame.

With reference to the flowchart of FIG. 23, at 304 the method 300 comprises translating the spine cover plate toward the central spine in a direction substantially perpendicular to the hinge axis as the first display-supporting frame is rotated relative to the second display-supporting frame. For example, and as described above in the example of FIGS. 2-11, the spring assemblies 164 cause the spine cover plate 114 to retract inwardly toward the central spine 122 in a direction perpendicular to the hinge axis 112 as the first display-supporting frame and second display-supporting frame are rotated from the end-to-end orientation of FIG. 7 to the face-to-face orientation of FIG. 9.

At 308 the method 300 includes biasing the spine cover plate toward the central spine with a plurality of resilient members. For example, and as described above in the example of FIGS. 2-11, the spring assemblies 164 bias the spine cover plate 114 toward the central spine 122. At 312 the method 300 includes translating a translatable block of the hinge assembly to cause a ramp surface of a slot defined in the translatable block to contact a protrusion that extends from the spine cover plate, thereby translating the spine cover plate toward the central spine. For example, and as described above in the example of FIGS. 12-22, translating the translatable block 234 in the positive Y-axis direction causes the first and second ramp surfaces 250, 252 in the first and second block sidewall slots 238, 241 to contact the first and second follower protrusions 220, 223 of the spine cover plate 214 and thereby by cause the spine cover plate to translate toward the central spine 222.

At 316 the method 300 includes at least partially closing a gap between the spine cover plate and the central spine. For example, and as described above in the example of FIGS. 2-11, as the first display-supporting frame 106 and second display-supporting frame 108 are rotated from the end-to-end orientation toward the face-to-face orientation, the spring assemblies 164 cause the spine cover plate 114 to translate toward the central spine 122 in the z-axis direction, thereby at least partially closing the gap 166 between the spine cover plate 114 and the outer surface 124 of the central spine 122.

The following paragraphs provide additional support for the claims of the subject application. One aspect provides a foldable computing device, comprising: a first display-supporting frame rotatably coupled to a second display-supporting frame along a hinge axis via a hinge assembly comprising a central spine extending parallel to the hinge axis; a flexible display supported by the first display-supporting frame and the second display-supporting frame; and a spine cover plate extending over the central spine and moveably coupled to the hinge assembly such that the spine cover plate is translated relative to the central spine in response to the first display-supporting frame being rotated relative to the second display-supporting frame. The foldable computing device may additionally or alternatively include, wherein the spine cover plate retracts toward the central spine as the first display-supporting frame and the second display-supporting frame are rotated from an end-to-end orientation to a face-to-face orientation. The foldable computing device may additionally or alternatively include, wherein the spine cover plate moves away from the central spine as the first display-supporting frame and the second display-supporting frame are rotated from an end-to-end orientation to a face-to-face orientation. The foldable computing device may additionally or alternatively include, wherein the central spine defines a plurality of spine guide apertures, and the spine cover plate comprises a plurality of spine guide pins moveably received within the guide apertures. The foldable computing device may additionally or alternatively include, wherein the spine cover plate is moveably coupled to the hinge assembly by a plurality of resilient members. The foldable computing device may additionally or alternatively include, wherein the plurality of resilient members bias the spine cover plate toward the central spine when the first display-supporting frame and the second display-supporting frame are in an end-to-end orientation. The foldable computing device may additionally or alternatively include, wherein a first end of each of the resilient members contacts the spine cover plate, and a second end of each of the resilient members contacts an anchor surface of the central spine. The foldable computing device may additionally or alternatively include, wherein the plurality of resilient members comprises a plurality of springs. The foldable computing device may additionally or alternatively include, wherein the plurality of springs comprises a first spring and a second spring connected by a base portion extending between the first spring and the second spring. The foldable computing device may additionally or alternatively include, wherein the first spring is attached to a first anchor surface on a first side of the hinge axis, and the second spring is attached to a second anchor surface on a second side of the hinge axis opposite to the first side. The foldable computing device may additionally or alternatively include, wherein the hinge assembly comprises a translatable block comprising a block sidewall that defines a slot, and the spine cover plate is moveably coupled to the hinge assembly via a protrusion extending from the spine cover plate into the slot. The foldable computing device may additionally or alternatively include, wherein the slot comprises a ramp surface, and as the first display-supporting frame is rotated relative to the second display-supporting frame the ramp surface of the slot contacts the protrusion to cause the spine cover plate to translate relative to the central spine in a direction perpendicular to the hinge axis. The foldable computing device may additionally or alternatively include, wherein the block sidewall is a first block sidewall that defines a first plurality of slots and the protrusion is a first protrusion of a first plurality of protrusions that extend into the first plurality of slots, and wherein the translatable block further comprises a second block sidewall that defines a second plurality of slots, wherein the second block sidewall is opposite the first block sidewall, and the spine cover plate further comprises a second plurality of protrusions that extend into the second plurality of slots.

Another aspect provides a method for retracting a spine cover plate in a foldable computing device, the foldable computing device comprising a first display-supporting frame rotatably coupled to a second display-supporting frame along a hinge axis via a hinge assembly comprising a central spine extending parallel to the hinge axis, and a flexible display supported by the first display-supporting frame and the second display-supporting frame, the method comprising: translating the spine cover plate toward the central spine in response to the first display-supporting frame being rotated relative to the second display-supporting frame. The method may additionally or alternatively include, wherein translating the spine cover plate toward the central spine comprises biasing the spine cover plate toward the central spine with a plurality of resilient members.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A foldable computing device, comprising:
    a first display-supporting frame rotatably coupled to a second display-supporting frame along a hinge axis via a hinge assembly comprising a central spine extending parallel to the hinge axis;
    a flexible display supported by the first display-supporting frame and the second display-supporting frame; and
    a spine cover plate extending over the central spine and moveably coupled to the hinge assembly by a plurality of resilient members that bias the spine cover plate toward the central spine when the first display-supporting frame and the second display-supporting frame are in an end-to-end orientation.

2. The foldable computing device of claim 1, wherein the spine cover plate retracts toward the central spine as the first display-supporting frame and the second display-supporting frame are rotated from an end-to-end orientation to the face-to-face orientation.

3. The foldable computing device of claim 1, wherein the spine cover plate moves away from the central spine as the first display-supporting frame and the second display-supporting frame are rotated from the face-to-face orientation to an end-to-end orientation.

4. The foldable computing device of claim 1, wherein the central spine defines a plurality of spine guide apertures, and the spine cover plate comprises a plurality of spine guide pins moveably received within the guide apertures.

5. The foldable computing device of claim 1, wherein a first end of each of the resilient members contacts the spine cover plate, and a second end of each of the resilient members contacts an anchor surface of the central spine.

6. The foldable computing device of claim 1, wherein the plurality of resilient members comprises a plurality of springs.

7. The foldable computing device of claim 6, wherein the plurality of springs comprises a first spring and a second spring connected by a base portion extending between the first spring and the second spring.

8. The foldable computing device of claim 7, wherein the first spring is attached to a first anchor surface on a first side of the hinge axis, and the second spring is attached to a second anchor surface on a second side of the hinge axis opposite to the first side.

9. The foldable computing device of claim 1, wherein the hinge assembly comprises a translatable block comprising a block sidewall that defines a slot, and the spine cover plate is moveably coupled to the hinge assembly via a protrusion extending from the spine cover plate into the slot.

10. The foldable computing device of claim 9, wherein the slot comprises a ramp surface, and as the first display-supporting frame is rotated relative to the second display-supporting frame the ramp surface of the slot contacts the protrusion to cause the spine cover plate to translate relative to the central spine in a direction perpendicular to the hinge axis.

11. The foldable computing device of claim 9, wherein the block sidewall is a first block sidewall that defines a first plurality of slots and the protrusion is a first protrusion of a first plurality of protrusions that extend into the first plurality of slots, and wherein the translatable block further comprises a second block sidewall that defines a second plurality of slots, wherein the second block sidewall is opposite the first block sidewall, and the spine cover plate further comprises a second plurality of protrusions that extend into the second plurality of slots.

12. The foldable computing device of claim 1, wherein the spine cover plate is moveably coupled to the hinge assembly such that the spine cover plate is translated in a direction substantially perpendicular to the central spine and the hinge axis in response to the first display-supporting frame being rotated relative to the second display-supporting frame.

13. The foldable computing device of claim 1, wherein the spine cover plate is moveably coupled to the hinge assembly such that the spine cover plate is translated relative to the central spine in response to the first display-supporting frame being rotated relative to the second display-supporting frame.

14. The foldable computing device of claim 1, wherein the spine cover plate is located closer to the central spine when the first display-supporting frame and the second display-supporting frame are in a face-to-face orientation as compared to when the first display-supporting frame and the second display-supporting frame are in an end-to-end orientation.

15. A method for retracting a spine cover plate in a foldable computing device, the foldable computing device comprising a first display-supporting frame rotatably coupled to a second display-supporting frame along a hinge axis via a hinge assembly comprising a central spine extending parallel to the hinge axis, and a flexible display supported by the first display-supporting frame and the second display-supporting frame, the method comprising:
    translating the spine cover plate toward the central spine in response to the first display-supporting frame being rotated relative to the second display-supporting frame from an end-to-end orientation to a face-to-face orientation, wherein the spine cover plate is moveably coupled to the hinge assembly by a plurality of resilient members that bias the spine cover plate toward the central spine when the first display-supporting frame and the second display-supporting frame are in an end-to-end orientation.

16. The method of claim 15, wherein translating the spine cover plate toward the central spine comprises translating a translatable block of the hinge assembly to cause a ramp surface of a slot defined in the translatable block to contact a protrusion that extends from the spine cover plate, thereby translating the spine cover plate toward the central spine.

17. The method of claim 15, wherein translating the spine cover plate toward the central spine comprises at least partially closing a gap between the spine cover plate and the central spine.

18. The method of claim 15, wherein the plurality of resilient members comprises a plurality of springs.

19. The method of claim 18, wherein the plurality of springs comprises a first spring and a second spring connected by a base portion extending between the first spring and the second spring.

20. A foldable computing device, comprising:
- a first display-supporting frame rotatably coupled to a second display-supporting frame along a hinge axis via a hinge assembly comprising a central spine extending parallel to the hinge axis;
- a flexible display supported by the first display-supporting frame and the second display-supporting frame; and
- a spine cover plate extending over the central spine and moveably coupled to the hinge assembly by a plurality of springs attached to the central spine on opposing sides of the hinge axis, wherein the spine cover plate translates toward the central spine as the first display-supporting frame is rotated relative to the second display-supporting frame from an end-to-end orientation to a face-to-face orientation, wherein the plurality of springs bias the spine cover plate toward the central spine when the first display-supporting frame and the second display-supporting frame are in the end-to-end orientation.

\* \* \* \* \*